US008670944B2

(12) United States Patent
Davidson

(10) Patent No.: US 8,670,944 B2
(45) Date of Patent: Mar. 11, 2014

(54) PROSPECT STRESS PREDICTION

(75) Inventor: John Kenneth Davidson, Newstead (AU)

(73) Assignee: Predrill Stresses International Pty. Ltd., Queensland (AU)

( * ) Notice: Subject to any disclaimer, the term of this patent is extended or adjusted under 35 U.S.C. 154(b) by 581 days.

(21) Appl. No.: 12/934,116

(22) PCT Filed: Mar. 25, 2009

(86) PCT No.: PCT/AU2009/000335
§ 371 (c)(1),
(2), (4) Date: Sep. 23, 2010

(87) PCT Pub. No.: WO2009/117766
PCT Pub. Date: Oct. 1, 2009

(65) Prior Publication Data
US 2011/0022322 A1    Jan. 27, 2011

(30) Foreign Application Priority Data
Mar. 27, 2008    (AU) ................................ 2008901477

(51) Int. Cl.
*G01L 1/00*    (2006.01)
(52) U.S. Cl.
USPC .......................................................... 702/42
(58) Field of Classification Search
USPC .................. 702/42, 18; 367/51, 14
See application file for complete search history.

(56) References Cited

U.S. PATENT DOCUMENTS 5,251,184 A    10/1993    Hildebrand et al.
6,885,944 B2    4/2005    Davidson
2003/0158669 A1*    8/2003    Davidson .................... 702/18
2003/0214537 A1*    11/2003    Lynn ............................ 345/835
2004/0109387 A1*    6/2004    Jenner et al. .................. 367/14
2004/0141414 A1*    7/2004    Huffman et al. .............. 367/51

FOREIGN PATENT DOCUMENTS

WO    WO 01/90783    11/2001
WO    WO 2009/011776    10/2009

OTHER PUBLICATIONS

Davidson, "Plate tectronic structural geology to detailed field and prospect stress prediction" APPEA Journal, Oct. 2008, 153-170.

* cited by examiner

*Primary Examiner* — Tung S Lau
*Assistant Examiner* — Xiuquin Sun
(74) *Attorney, Agent, or Firm* — Venable LLP; Robert S. Babayi

(57) ABSTRACT

A method is provided for obtaining a quantitative prediction of a magnitude of a maximum horizontal stress ($S_H/S_V$) at a point on a horizon within a prospect including the following steps: a) receiving seismic reflection data including a plurality of seismic reflection lines within the prospect; b) interpreting the seismic reflection data to identify at least four horizons produced during a compressional pulse period and at least one anticline and/or syncline; c) mapping in plan the identified anticlines and/or synclines; d) classifying each anticline into one or more predefined stress states based on the length of the anticline and its proximity to adjacent anticlines and/or classifying each syncline into one or more predefined stress states based on the length of the syncline and its proximity to adjacent synclines; wherein each predefined stress state corresponds to a predetermined value for the magnitude of the maximum horizontal stress ($S_H/S_V$).

19 Claims, 20 Drawing Sheets

PROSPECT STRESS PREDICTION

CROSS-REFERENCE TO RELATED APPLICATIONS

This application is the National Stage of International Application No. PCT/AU2009/000335 filed Mar. 25, 2009, which claims the benefit of AU application number 2008901477 filed Mar. 27, 2008, the disclosures of which are incorporated herein by reference in their entirety.

FIELD OF THE INVENTION

This invention relates to interpretation of seismic reflection data and in particular its use in providing a quantitative prediction of the magnitude of stresses acting within sedimentary basins in the Earth's crust. The invention has a particular application in the hydrocarbon exploration and production industry and it will be convenient to hereinafter describe the invention in relation to this particular application. It should be appreciated however that the invention has wider application.

BACKGROUND TO THE INVENTION

Exploration for hydrocarbons is a risky business. There is no guarantee that having identified an area likely to contain hydrocarbons, commonly referred to as a prospect, hydrocarbons will be extracted. Hydrocarbons and in particular oil and natural gas accumulate and form reservoirs in sedimentary basins in the Earth's crust. The oil and gas will desire to permeate through the sedimentary basin as a result of density and pore pressure differences and from compressional stresses generated within the Earth's crust. The oil and gas will tend to rise through the sedimentary basin until stopped by a seal, such as a layer of shale, where it will accumulate and form a reservoir.

The process of successfully extracting hyrdocarbons requires an appreciation of the stresses acting across the prospect. The mutually perpendicular compressional components of the stresses acting across any prospect may be expressed as $S_v$ (vertical stress), $S_H$ (maximum horizontal stress), $S_h$ (minimal horizontal stress). Whilst an appreciation of these stresses is required for various stages of the exploration and extraction process, appreciation is particularly important when drilling an extraction wellbore. More specifically when these stress components are not equated they tend to deform the wellbore cross section from a circle to an ellipse, a phenomenon known as wellbore breakout, which in some cases can lead to the collapse of the wellbore.

As discovery rates continue to decline, emphasis is turning from new basins and plays to smaller intra-basin discoveries requiring more detailed understanding of basin forming faults and their local stress effects on traps and trap geometries. Improved oil recovery is not only about finding new fields, but also demands detailed stress information for horizontal wellbore stability in order to economically and effectively increase reserves and recovery rates by extracting new oil from old fields. As a result, expensive wellbore based measurements have been deployed over the past 15 years. These precision measurements have then been averaged between wellbores for stress prediction but stress directions are known to vary abruptly by up to 90° over distances of less than 2 kilometers.

International patent application PCT/AU01/00568 published as WO01/90783 assigned to Petrecon Australia Pty Ltd and herein incorporated in its entirety by reference disclosed an improved solution involving the seismic recognition of globally synchronous compressional pulses. Seismic reflection data can be interpreted to suggest that the last period of compression producing these structures commenced in the Pliocene geological epoch some five million years ago, and that similar compressional pulse periods have occurred repeatedly since at least the Early Triassic some 240 million years ago. When comparing the seismic data from locations around the Earth the pulse periods can be interpreted as globally synchronous. FIG. 1 is a table showing the periods and locations of globally synchronous compressional pulses. This recognition provides a workflow for stress consistent seismic interpretation which can predict horizontal and vertical changes in the direction of the maximum horizontal compressional component of a stress $S_H$ ($S_H$D).

It is an object of this invention to provide a method of proving a quantitative estimation or prediction of the magnitude of the stress components acting within a prospect pre-drill.

Other objects and advantages of the invention will become apparent to those of ordinary skill in the art having reference to the following specification together with its drawings.

SUMMARY OF THE INVENTION

According to an aspect of the invention there is provided a method of providing a quantitative prediction of a magnitude of a maximum horizontal stress ($S_H/S_V$) at a point on a horizon within a prospect including the following steps:
a) receiving seismic reflection data including a plurality of seismic reflection lines within the prospect;
b) interpreting the seismic reflection data to identify at least four horizons produced during a compressional pulse period and at least one anticline and/or syncline;
c) mapping in plan the identified anticlines and/or synclines;
d) classifying each anticline into one or more predefined stress states based on the length of the anticline and its proximity to adjacent anticlines and/or classifying each syncline into one or more predefined stress states based on the length of the syncline and its proximity to adjacent synclines;
  wherein each predefined stress state corresponds to a predetermined value for the magnitude of the maximum horizontal stress ($S_H/S_V$).

In an embodiment, the step of interpreting the seismic reflection data to identify at least four horizons produced during a compressional pulse period includes the following steps:
i) selecting at least two seismic reflection lines which cross the prospect substantially in the direction of maximum dip;
ii) selecting at least one further seismic line which lies substantially along a longitudinal axis of the prospect;
iii) identifying on one of the plurality of seismic lines at least one substantially vertical crust cutting fault;
iv) identifying on the selected seismic lines a plurality of horizons; and
v) identifying on the selected seismic lines at least four horizons, a first pair of horizons produced in a first compressional pulse period and a second pair of horizons produced in a second compressional pulse period.

In one form of the invention, areas on the seismic lines at a horizon produced during the first compressional pulse period where there is at least one anticline are classified as being in an uplift stress state.

In another form of the invention, the method further includes the step of:

e) identifying on the seismic lines at a horizon produced during the second compressional pulse period areas where there are no anticlines or synclines;
   wherein the magnitude of the maximum horizontal stress ($S_H/S_V$) decreases from the area identified in step b to the area identified in step e.

In yet another form of the invention, the method further includes the steps of:

f) selecting a horizon which was produced during a compressional pulse period that is cut by at least one fault; and
g) classifying each fault into one or more predefined stress states based on the length of each fault.

A fault that cuts a horizon produced during a compressional pulse period may be classified as being in a reverse or normal stress state.

According to an embodiment, a normal stress state is defined as a straight normal fault greater than 2 kilometers in length.

According to another embodiment, a loading stress state is defined as having no anticline and no fault.

According to yet another embodiment, an uplift stress state is defined as a straight anticline greater than 2 kilometers in length with the nearest straight anticline greater than 2 kilometers in length and more than 5 kilometers away.

According to still another embodiment, an extensional strike slip stress state is defined as a straight normal fault equal to or less than 2 kilometers in length.

According to still another embodiment, a strike slip stress state is defined as a straight anticline greater than 2 kilometers in length with the nearest straight anticline greater than 2 kilometers in length and equal to or less than 5 kilometers away, or a straight syncline greater than 2 kilometers in length with the nearest straight syncline greater than 2 kilometers in length and equal to or less than 5 kilometers away According to a further embodiment, a compressional strike slip state is defined as a straight reverse fault equal to or less than 2 kilometers in length.

According to still a further embodiment, a reverse stress state is defined as a straight reverse fault greater than 2 kilometers in length.

In accordance with one form of the invention, the magnitude of the maximum horizontal stress ($S_H/S_V$) decreases from the reverse stress state through to the normal stress state.

In one particular form of the invention:
a) a normal stress state corresponds to a maximum horizontal stress magnitude ($S_H/S_V$) in a range of 0.825 to 0.675;
b) a loading stress state corresponds to a maximum horizontal stress magnitude ($S_H/S_V$) in a range of 0.875 to 0.825;
c) a uplift stress state corresponds to a maximum horizontal stress magnitude ($S_H/S_V$) in a range of 0.975 to 0.875;
d) an extensional strike slip stress state corresponds to a maximum horizontal stress magnitude ($S_H/S_V$) in a range of 1.075 to 0.975;
e) a strike slip stress state corresponds to a maximum horizontal stress magnitude ($S_H/S_V$) in a range of 1.200 to 1.075;
f) a compressional strike slip stress state corresponds to a maximum horizontal stress magnitude ($S_H/S_V$) in a range of 1.400 to 1.200; and
g) a reverse stress state corresponds to a maximum horizontal stress ($S_H/S_V$) magnitude in a range of 4.000 to 1.400.

The method may further include the step of repeating the method of determining the magnitude of the maximum horizontal stress ($S_H/S_V$) for a plurality of horizons produced during a compressional pulse period, and extrapolating the results obtained between the horizons.

In another embodiment, the method further includes the step of providing a quantitative prediction of an approximate fracture gradient ($S_h/S_V$) by classifying each anticline into one or more predefined stress states based on the length of each anticline and its proximity to adjacent anticlines and/or by classifying each syncline into one or more predefined stress states based on the length of each syncline and its proximity to adjacent synclines, wherein each predefined stress state corresponds to a predetermined value for the fracture gradient.

In yet another embodiment, the method further includes the step of providing a quantitative prediction of the approximate fracture gradient ($S_h/S_V$) by classifying each fault into one or more predefined stress states based on the length of each fault.

In one particular form of the invention:
a) a normal stress state corresponds to an approximate fracture gradient ($S_h/S_v$) in a range of 0.725 to 0.650;
b) a loading stress state corresponds to an approximate fracture gradient ($S_h/S_v$) in a range of 0.775 to 0.725;
c) a uplift stress state corresponds to an approximate fracture gradient ($S_h/S_v$) in a range of 0.825 to 0.775;
d) an extensional strike slip stress state corresponds to an approximate fracture gradient ($S_h/S_v$) in a range of 0.875 to 0.825;
e) a strike slip stress state corresponds to an approximate fracture gradient ($S_h/S_v$) in a range of 0.925 to 0.875;
f) a compressional strike slip stress state corresponds to an approximate fracture gradient ($S_h/S_v$) in a range of 1.000 to 0.925; and
g) a reverse stress state corresponds to an approximate fracture gradient ($S_h/S_v$) in a range of 1.500 to 1.000.

According to an embodiment, the method further includes the step of determining a pore pressure between a pair of horizons, wherein the pore pressure has a normal gradient within a pair of horizons that is uniform or includes an anticlinal thin over the prospect.

The method may further include the step of determining a pore pressure between a pair of horizons, wherein the pore pressure has an elevated gradient within a pair of horizons that include a synclinal thick overlying an anticlinal thin over the prospect.

Moreover, the step of determining a pore pressure between a pair of horizons may include measuring a thickness of a synclinal thick relative to a proximal anticlinal thin, wherein a ratio of the thickness of the synclinal thick to the thickness of the anticlinal thin is proportional to an increase in pore pressure above the normal gradient.

The pore pressure may increase to a maximum of twice the normal pore pressure gradient.

According to another aspect of the present invention, there is provided a system for providing a quantitative prediction of a magnitude of a maximum horizontal stress ($S_H/S_v$) at a point on a horizon within a prospect, the system comprising a processor and associated memory device for storing a series of instructions to cause the processor to carry out a method as herein described.

According to yet another aspect of the present invention, there is provided computer software for use in a system for providing a quantitative prediction of a magnitude of a maximum horizontal stress ($S_H/S_v$) at a point on a horizon within a prospect, the system comprising a processor and associated memory device for storing the computer software including a series of instructions to cause the processor to carry out a method as herein described.

The invention has various applications and advantages, some of which are identified below.

It is important to correctly direct the drill so that the effect of the stresses acting on the wellbore will be substantially minimised. It would be desirable to be able to estimate the magnitude as well as the direction of stress components $S_H$, $S_h$ and $S_v$ before drilling, to improve the likelihood of equating the stresses acting across the wellbore, and thereby increase the stability of the walls of the wellbore by employing the most effective drilling fluid density.

Wellbore instability problems can cause wellbores to be re-commenced or sidetracked at various depths with limited time to plan the side-tracked wellbore. Since seismic data is gathered before any drilling within a prospect, seismic determination of $S_H$ magnitude and direction would be desirable prior to the expensive decision to side-track.

The oil and gas can leak from the reservoir up a permeable fault, a dislocation extending through the seal, however, it has been noticed that when $S_H$ is substantially perpendicular to the fault it will tend not to leak, and when $S_H$ is substantially parallel to the fault it will tend to leak. It would be advantageous in the exploration process to be able to determine which faults would tend to leak and which faults would tend not to leak without having to drill through the reservoir within a prospect.

Actively leaking faults substantially parallel with $S_H$ allow fluids from deeper reservoirs and at high pressures to increase the pressures above the norm in shallower horizons and cause drilling hazards in such horizons if the drilling fluid density is too low. If the wellbore trajectory is parallel to sub parallel with the fault-line and the wellbore intersects the fractured zone adjacent to the active fault the fractured material may collapse and slough into the wellbore and cause the drillpipe to become stuck. This collapse problem can be significant associated with presently inactive faults in normally pressured zones and in both instances potential collapse can be reduced considerably if the wellbore is drilled perpendicular to the fault thus indicating it is desirable to be able to map the orientation of the fault and to predict the orientation and magnitude of $S_H$ predrill.

Fractures within a low permeability reservoir act as if they are small faults and tend to be open or closed depending on the stresses within the reservoir. Oil and gas can flow preferentially through the open fractures in the reservoir and it would be desirable to predict prior to drilling in which direction such flow is likely to be greatest. Similarly the effective permeability of a reservoir can be increased by increasing the fluid pressure within the reservoir to the point where the reservoir rocks will fracture parallel with $S_H$ a predrill knowledge of the direction and magnitude of which is desirable in order to predict the orientation of the planned fractures.

The process of secondary recovery of hydrocarbons by water-flooding requires knowledge of open fracture direction and leaking fault orientation and also of possible fractures formed as a result of the water-flood all of which can be determined by a field-wide knowledge of $S_H$ direction and magnitude gained from producing well stress analyses supplemented by the method of the present invention.

The disposal of drilling cuttings and liquid waste during the offshore production drilling process is often achieved by injection of such materials into the hydrocarbon-depleted reservoir by a process of fracture formation parallel with $S_H$. An accurate understanding of the distribution of $S_H$ direction hence of waste fracture orientation is required pre-disposal in the oil industry so as not to interfere with on-going production and in other possible waste disposal projects such as carbon dioxide sequestration in order to not interfere with groundwater resources.

Where the determination of $S_H$ is to be used to identify those faults that would tend to leak and those faults that would tend to seal the method may include identifying the fault on at least two seismic reflection lines, mapping in plan the faults, wherein the fault will tend to seal where $S_H$ is substantially perpendicular to the fault, whilst the fault will tend to leak where $S_H$ is at an angle to the fault other than substantially perpendicular. The method may further include identifying whether the fault cuts the entire upper crust as this would tend to indicate that the fault would be likely to be perpendicular to $S_H$ and therefore tend not to leak. It should be appreciated that the reverse scenario indicates that the fault would tend to leak. With this information, the exploration geologists and geophysicists can make informed judgment as to the likelihood of oil and gas leaking from the reservoir and therefore the potential profitability of drilling for oil and gas at that prospect.

It should be appreciated that where the Earths upper crust has yielded under a compressional stress to create the anticlines and synclines that the direction of the major horizontal compressional stress component $S_H$ at that time would have been substantially perpendicular to those anticlines or synclines. Given that the Earth's crust is currently experiencing a compressional pulse $S_H$ will be similarly directed today because the orientation of the crust cutting faults which control the direction of the anticlines and synclines has not changed.

BRIEF DESCRIPTION OF THE DRAWINGS

It will be convenient to hereinafter describe the invention in greater detail by reference to the accompanying figures which facilitate understanding of the method according to this invention. The particularity of the figures and the related description is not to be understood as superseding the generality of the broad identification of the invention as given in the attached claims.

DETAILED DESCRIPTION

The stress at a point is defined as three mutually perpendicular compressional components, the vertical stress component $S_v$, the maximum horizontal stress component $S_H$ and the minimum horizontal stress component $S_h$. The load or weight of the rocks at a point in a sedimentary basin is known quantitatively or can be reasonably estimated. Since gravity acts vertically, Anderson (1951) deduced that the weight of the rocks $S_v$ could have three states wherein it could be the largest, intermediate or smallest of the mutually perpendicular compressional components leading to definition of the three Anderson stress states as follows:

R reverse or thrust faulting wherein $S_H \gg S_h > S_v$
SS strike slip faulting wherein $S_H > S_v > S_h$
N normal faulting wherein $S_v > S_H > S_h$ $S_H$ is perpendicular to and controlled by basement zones of weakness such as crust cutting faults. The direction of $S_H$ (hereinafter also referred to as $S_H D$) can vary by up to 90° over horizontal distances of less than 2 kilometers. Given $S_H$ is a vector, it is incorrect to average two or more $S_H D$'s to establish local $S_H$ trends.

Horizontal forces which displace continents thousands of kilometers have been attributed to plate tectonics. Vertical forces influence the major horizontal force $S_H$ through changes in the curvature of the crust. Vertical forces are globally pulsed, uplifting and depressing continents hundreds of meters, hence contributing to $S_H$ variation from prospect structures, through basins and on a global scale.

The Earth is not a perfect oblate spheroid. The geoid is approximately 15 meters higher and lower respectively at the North and South Poles, and 7 meters lower and higher respectively at the northern and southern mid latitudes. Satellite based studies have shown that whilst some latitudes are decreasing and the curvature of the crust is reducing, others are increasing. The measured rates account for the 7 meter aberrations from a perfect oblate spheroid over a thousand years. If these aberrations continued for a few million years, the shape of the Earth would be drastically altered from the slightly pear-shaped oblate spheroid. Accordingly, the process must reverse and these oblate spheroidal departures must be pulsing.

Figure 1A:
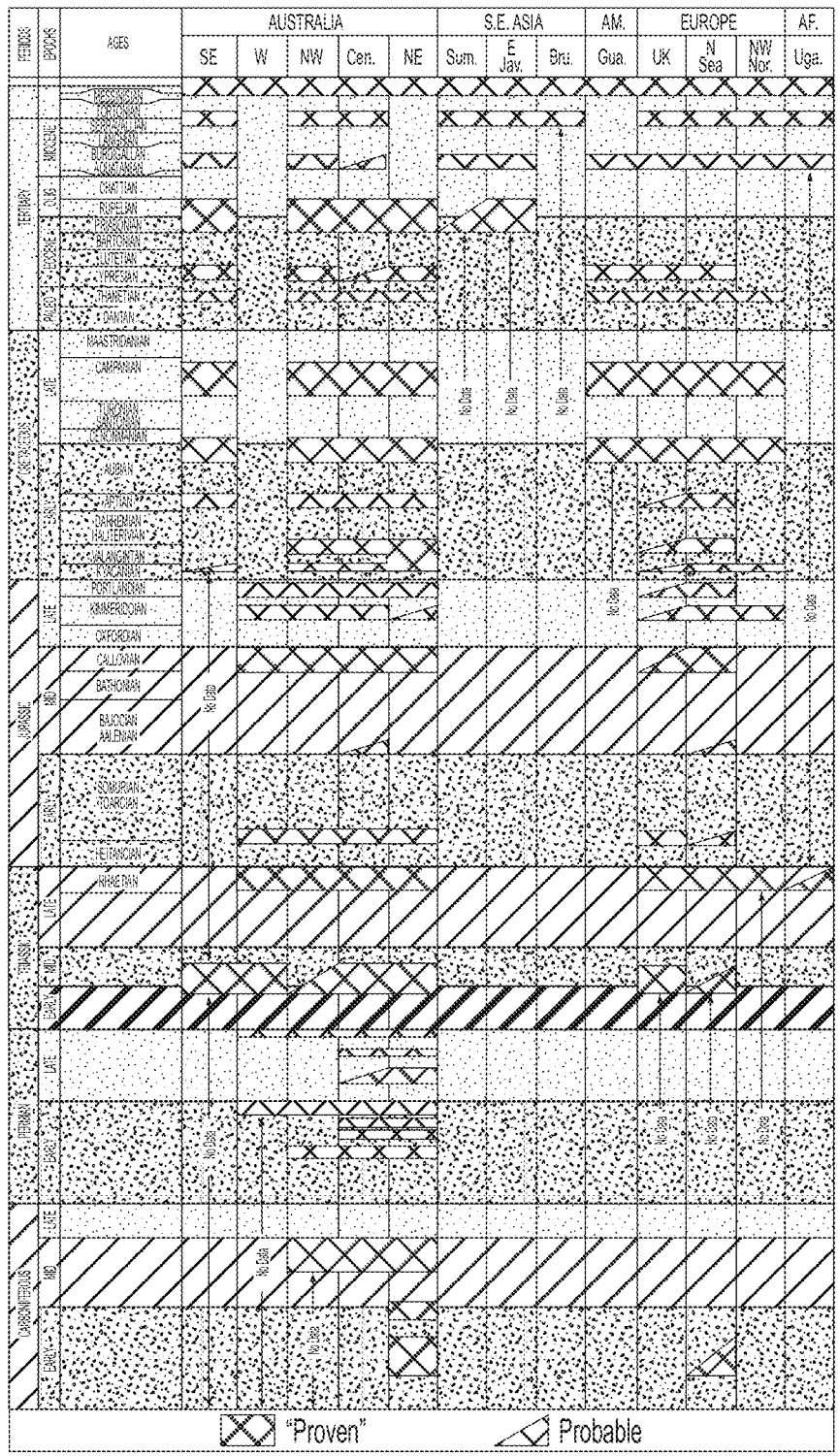
FIG. 1 is a table showing the periods and locations of globally synchronous compressional pulses.
Figure 1B:
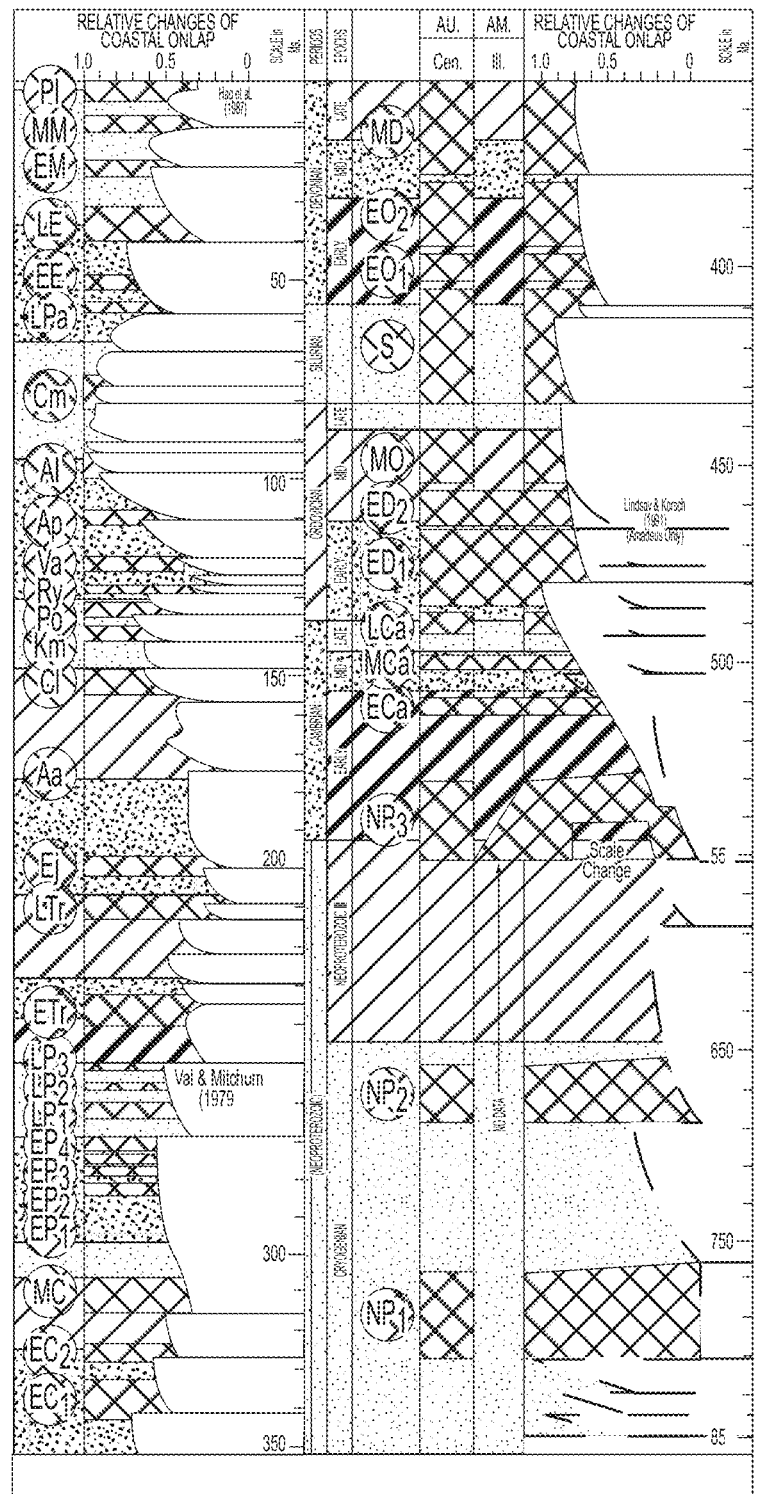

The Earth is pulsed on a scale of millions of years (see FIG. 1). Sixteen compressional pulses have been seismically recognised since the Early Triassic. The present pulse spans the Pliocene (Pl) to Recent (5 million years). It appears the Earth radius' present annual increase of 3 to 4.15 millimeters per annum may have spanned this compressional peak in the pulse and possibly each pulse but may have decreased by a similar amount between compressional pulse peaks. The present rapidly pulsing northern Earth waist and southern bulge of 10's to possibly 100's of meters are apparently imposed on a longer pulsing radius change of possibly kilometers. These seismically recognised compressional pulses are measured by seismic onlap. The pulses are tectonic with sedimentary onlap onto inversions and/or anticlinal growth.

The dominance of intra-continental compression is known on most continents from mine stress measurements in basement rocks. The ratio $S_H/S_v$ (hereinafter also referred to as the magnitude of $S_H$ or $S_H M$) was demonstrated as increasing from greater than 1 at a depth of 2.5 kilometers to 4 at the Earth's surface (see FIG. 2 top left). Intra-continental reverse fault earthquake focal mechanism solutions also indicate $S_H/S_v$ generally does not reach unity until a depth of 10 kilometers in average, un-thinned crust, and nearer 20 kilometers in deeper basins where the crust has thinned. Deeper earthquakes under the Adelaide Hills (17 kilometers) and under the Viking Graben (21 kilometers) give extensional normal fault solutions in these un-thinned and thinned crustal settings, respectively.

Figure 2:
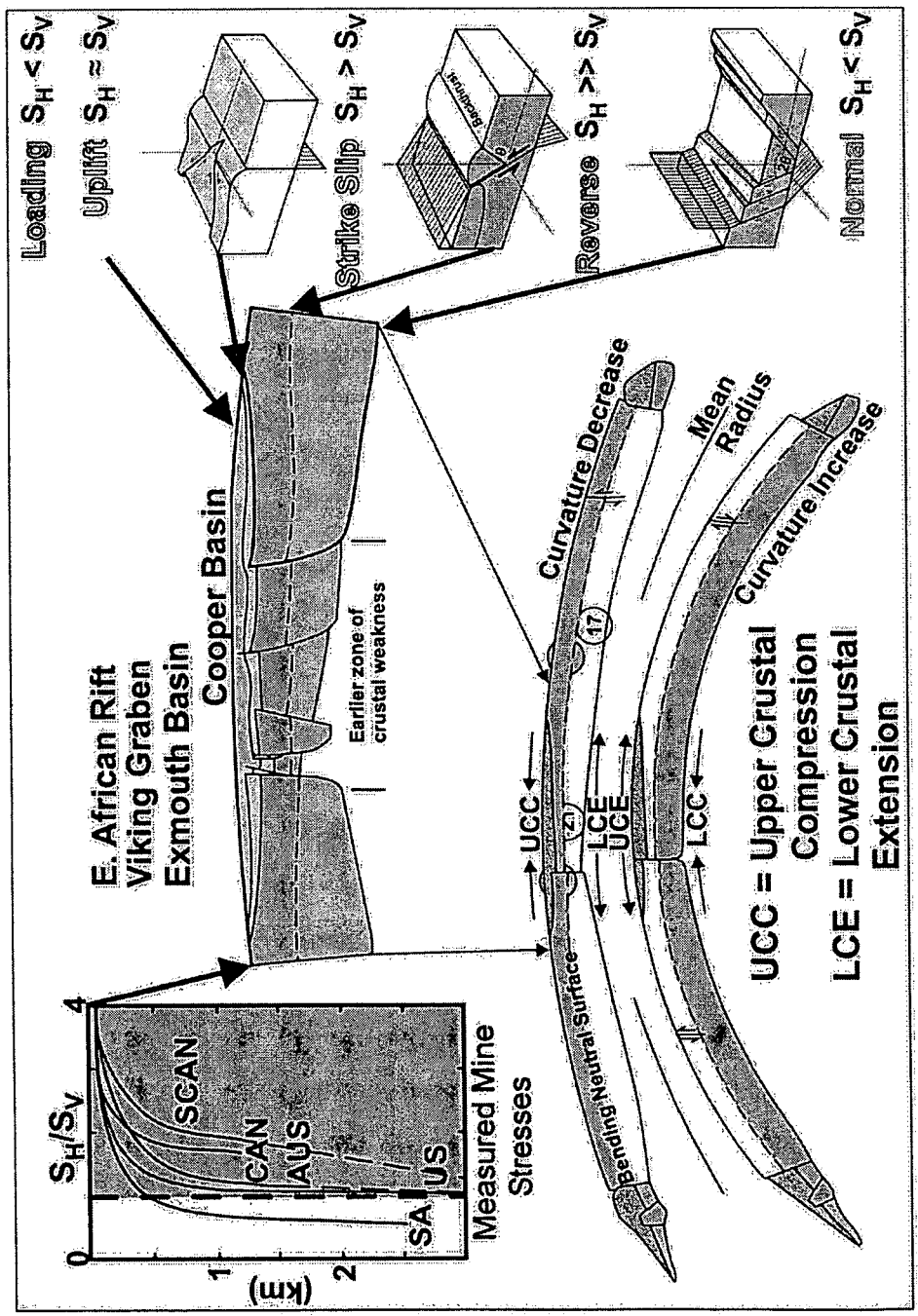
FIG. 2 is a diagrammatic representation of upper and lower crustal compression and extension during Earth surface curvature decrease and increase, possibly pulsing about a mean radius.

Together, the shallow and deep data indicate the Earth's crust is flexing possibly about a mean radius as shown in FIG. 2. During a compressional pulse the crust acts as a hinge and the upper crust and basinal sediments experience upward bending or flattening resulting in compression (UCC) but the basin still subsides due to lower crustal extension (LCE) thus causing the sediments to be compressed while being deposited, thereby preserving the sediments and the compressional pulse which can be mapped seismically. Between the compressional pulses the bending can reverse causing upper crustal extension (UCE) and lower crustal compression (LCC).

Figure 3:
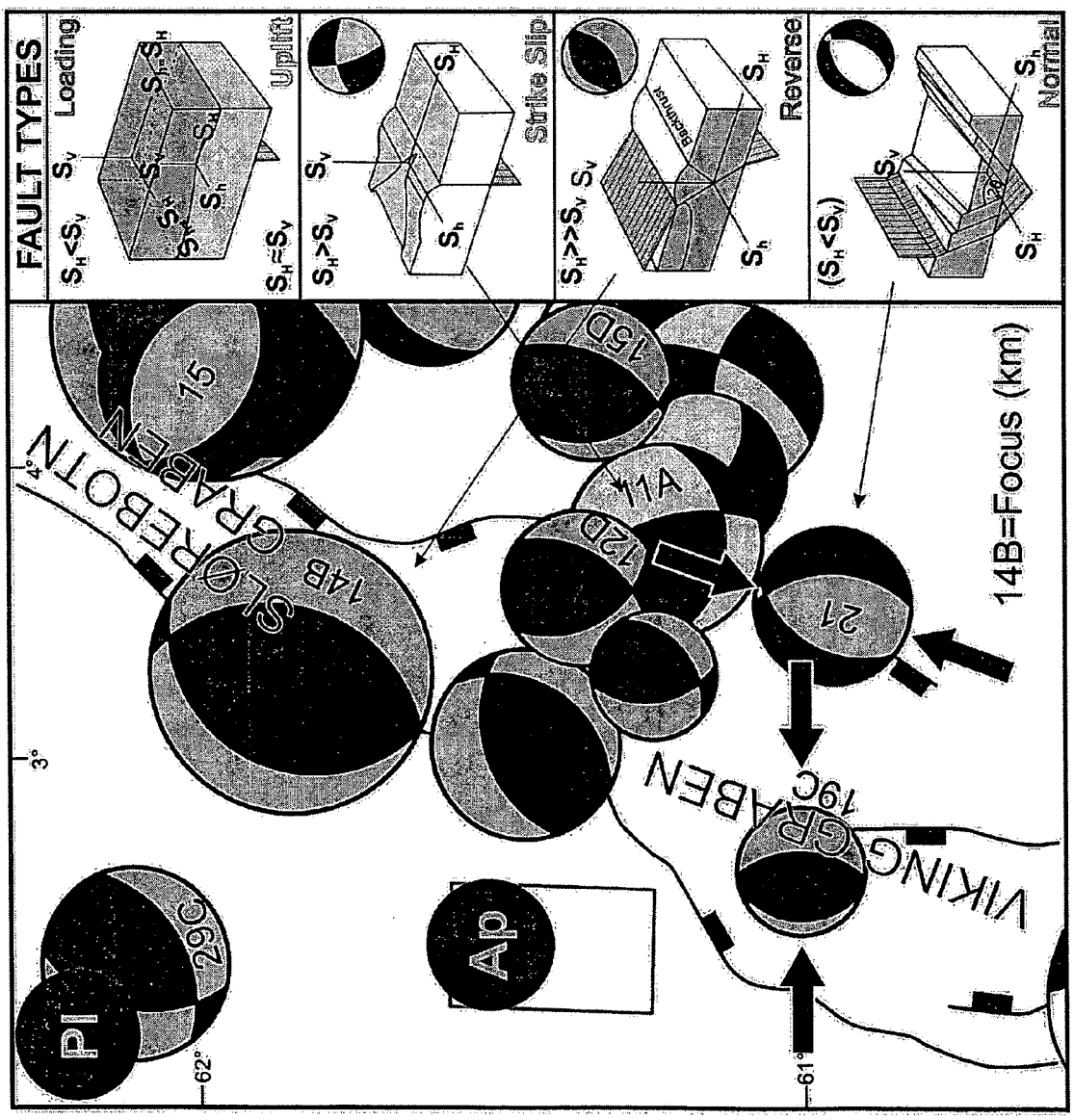
FIG. 3 shows earthquake focal mechanism solutions in the Viking Graben, North Sea related to the Anderson stress states of reverse, strike slip and normal faulting.

Referring now to FIG. 3, earthquake focal mechanism solutions at depths of 14 to 19 kilometers under the axis of the Viking Graben show reverse fault compressional movements perpendicular to the axis and contrary to the extensional implications generally associated with the word "graben". Normal fault solutions are not present beneath the axis because the rigidity of the lower crust is probably too low to build up stress to the point of brittle failure. Lower crustal extension (LCE) is observed to the east below the shallower reverse fault solutions (12 to 15 kilometers) where the lower crust is at a depth of 21 kilometers and the rocks rigid enough to experience brittle deformation. The present compressional pulse (Pliocene to Recent) causes $S_H$ to result from reverse faulting across the Viking Graben axis, not from normal faulting ($S_H$ parallel with the axis) as implied by the term "graben".

$S_H$ in the upper crust is being transmitted to the sedimentary section. $S_H$ magnitude ($S_H M = S_H/S_v$) can be described in terms of the three Anderson stress states and four sub divisions of the Anderson stress states introduced by the present invention. The four subdivisions of the Anderson stress states are compressional strike slip, extensional strike slip, uplift and loading. $S_H M$ decreases from $S_H \gg S_v$ (reverse (or thrust) faulting) in the deeper basin (14-20 kilometers), to $S_H > S_v$ (strike slip) in the intermediate basin (3 kilometers, Aptian), to $S_H \approx S_v$ (uplift) in the shallow basin, to $S_H < S_v$ (loading) in the shallow basin to seabed. The reducing curvature causes the lower crust to extend which, if sufficiently rigid, will fail by normal faulting (21 kilometers). The Anderson fault diagrams shown in FIG. 3 form a vertical sequence during a compressional pulse.

Figure 4A:
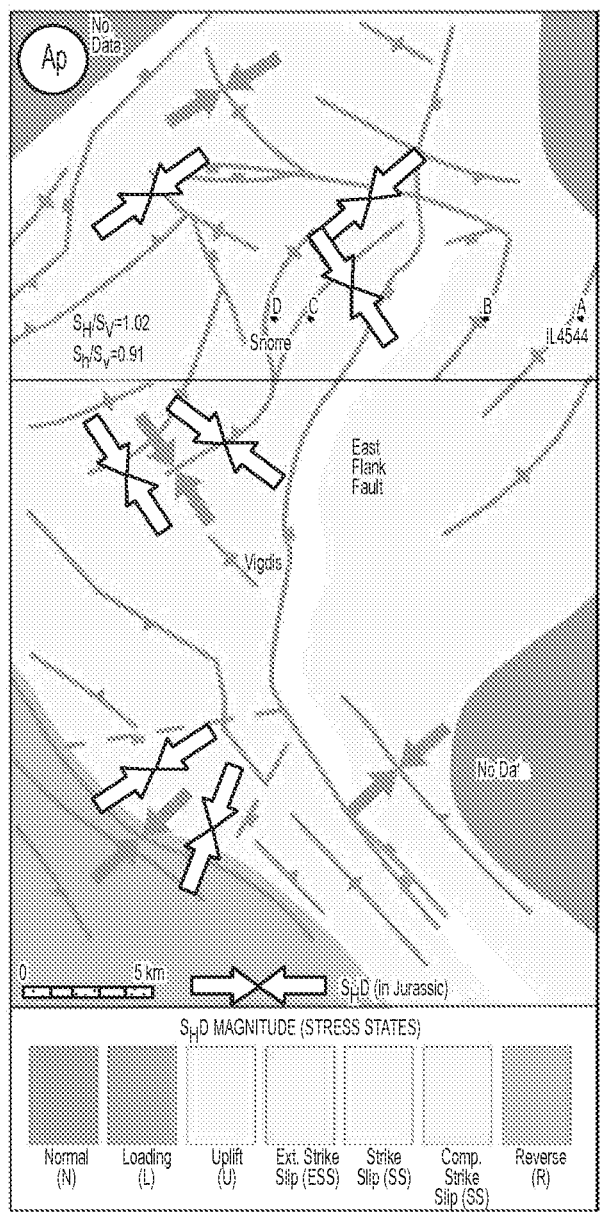
FIG. 4 is a diagrammatic representation of seismically derived stress states over the Snorre area (located in the rectangle in FIG. 3) during the Aptian compressional pulse, being a time of major displacement on the crust cutting fault (e.g. scimitar fault) shown at the Inner Collapse on the seismic line.
Figure 4B:
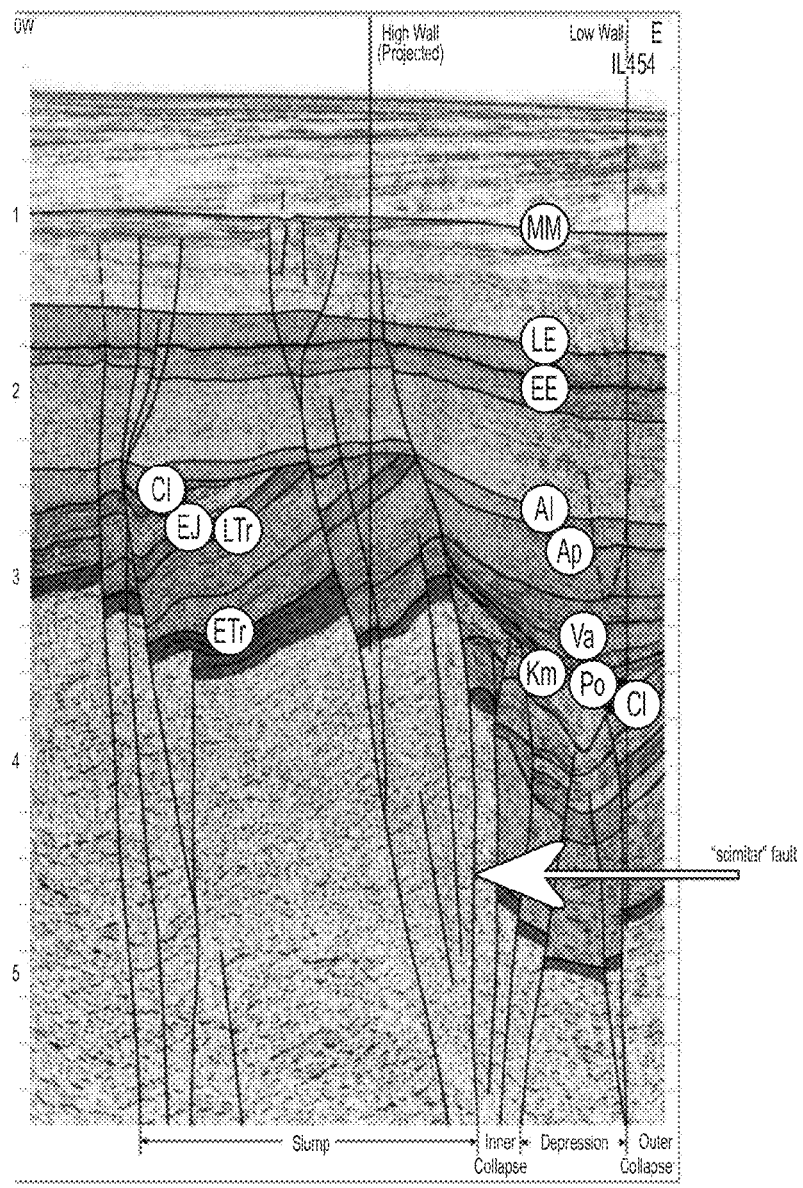

Referring now to FIG. 4, the Anderson stress states and sub divisions thereof have been recognised on reflection seismic data in the Snorre area. Mapping anticlinal thins and reverse faults formed during the Aptian compressional pulse enables the stress states to be identified, hence $S_H M = S_H/S_v > 1$ or strike slip during the deposition of the Aptian sediments immediately above the reservoir.

The pre-drill seismically derived $S_H D$ from the Aptian (Ap) compressional pulse anticlines over the Snorre area, show $S_H D$ is perpendicular to the East (and Southeast Flank) crust-cutting faults. Such 90° variations in $S_H D$ are identifiable on the 5 kilometer seismic line grid used in this example. Usually a 250-300 m grid over a field or prospect is used to detect similar variations against crust-cutting faults greater than 2 kilometers length. Aptian $S_HD$'s parallel today's wellbore breakout derived $S_HD$'s at the Jurassic reservoir, immediately below the Aptian. Since the strike or trend in plan of the crust cutting faults has not changed, $S_HD$ and $S_HM$ can be determined at any depth.

The reverse fault solutions in the Viking Graben axis reflect the upper crustal compression (UCC) being imposed on the deep graben sediments. $S_H/S_v$ will decrease vertically to the surface as the rigidity of the sediments decreases and the ability to transmit compressional stress also decreases. The reduction in stress is reflected in a vertical change in stress states (see FIGS. 2 and 3), i.e. the Earth surface curvature reduction causes the stress states to form a sequence from normal faulting in the lower crustal extension (LCE) to reverse faulting in the upper crust and $S_HM$ decreases through decreasing stages of strike slip then to uplift to loading through the sedimentary section due to decreasing rigidity and ability of the sedimentary section to transmit the reverse fault stress from below. The same stress changes occur horizontally.

The controlling factor of repeated $S_HD$ up-section is the East Flank Fault to which $S_HD$ is perpendicular. The fault is large and crust-cutting with normal displacement of 2 seconds (two-way time) at the Jurassic and is steep to reversed at depth where it cuts the deepest sedimentary section of the "Inner Collapse" at the bottom of the seismic line and then the upper crust. The fault is curved and is here termed a "scimitar fault" because the curvature resembles a sword of Middle East origins often cutting in a reverse fault manner deep in the section and as a normal fault high in the section. These displacements and curvature are a function of compressional pulses and owe their origin to the hinge effect of the bending crust, i.e. the reverse fault component is reflecting the upper crustal compression and the shallow normal components are a response to the down-dropping caused by the lower crustal extensional stopping effects. Variable magnitude of pulses may create more than a single curve on a scimitar fault.

Anderson reverse, normal and strike slip faults were defined at the Earth's surface being a surface of zero stress. The change in dip of each Anderson fault plane with depth, induced by confining pressure, rigidity etc, were not specifically addressed by Anderson but to give an indication, the striped fault surfaces have been projected up and down on the right of FIGS. 2 and 3. In the case of curvature change of the scimitar fault, the stress actually changes vertically due to the bending effect of crustal curvature.

Horizontally, the compression imparted by these faults is perpendicular to their strike both during past pulses, and now. The change in trend of $S_HD$ by about 90° (FIG. 4 centre left) reflects the change in strike of the crust-cutting, East Flank scimitar fault. The Snorre example shows this horizontal change in $S_HD$ can occur over less than 10 kilometers and has been observed in other areas down to less than 2 kilometers. This change is a function of distance from the crust-cutting fault; the closer to the fault the greater the influence in terms of $S_HD$ and $S_HM$. There will generally be a change in $S_HD$ vertically over similar distances resulting in an averaging of $S_HD$'s in units above the tops of similarly vertically penetrating faults; or one fault may persist to shallower depths and therefore locally control $S_HD$, but at a lower $S_HM$.

Before any oil or gas can be extracted from a reservoir, substantial research is required. Seismic reflection data are obtained for the prospect from which the general location and dimensions of any reservoir can be estimated. The method of obtaining such seismic reflection data is well understood by those in the relevant industry and will not be detailed here. Rather the present invention is directed to the interpretation and analysis of that data.

The method described herein is executed by a computer system comprising a processor and associated memory device for storing a series of instructions to cause the processor to carry out the steps of the method to provide a quantitative prediction of a magnitude of the maximum horizontal stress ($S_H$) at a point on a horizon within a prospect. The method firstly involves importing seismic data or seismic reflection lines which have been interpreted using a commercially available software program such as Kingdom™ or Petrel™.

Figure 5:
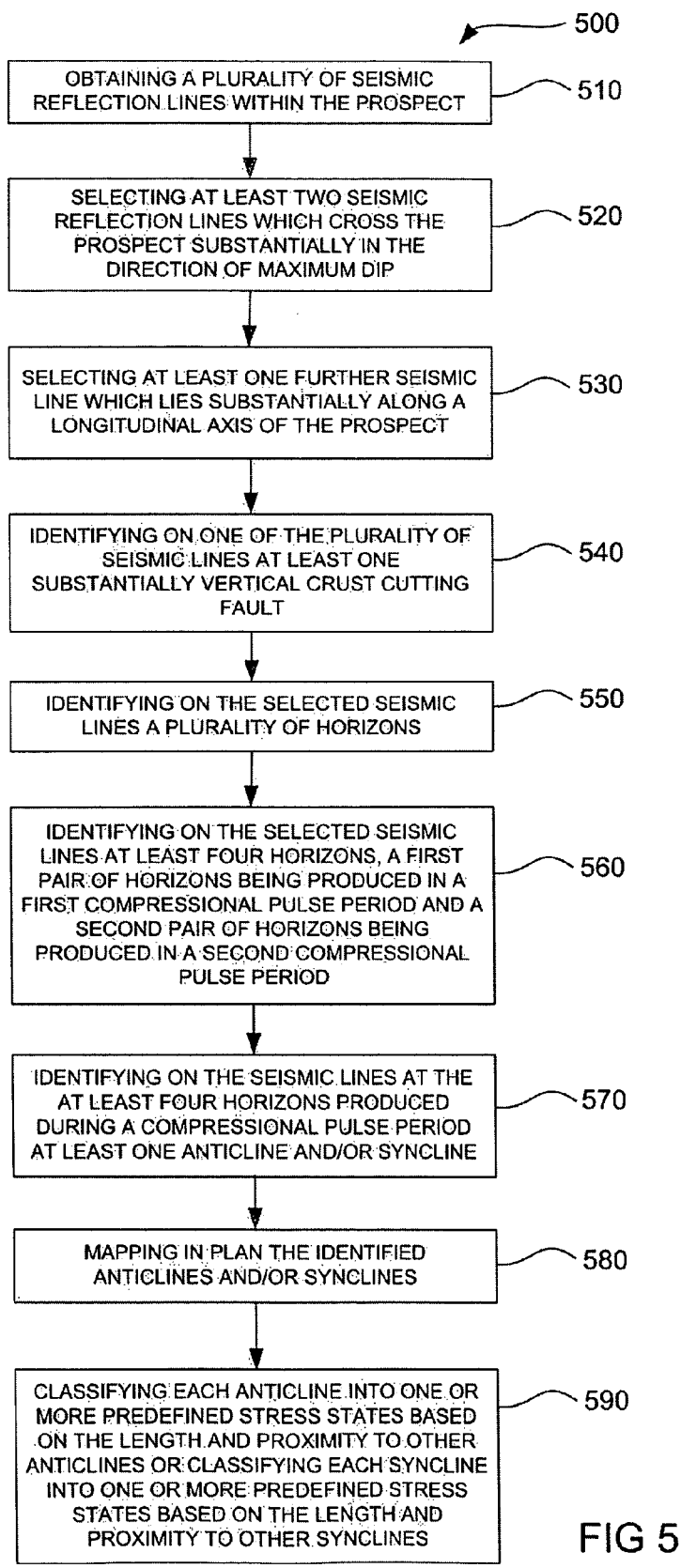
FIG. 5 is a flowchart showing the method according to an embodiment of the present invention.

Referring now to FIG. 5, at step 510 the method requires a minimum of two seismic reflection lines and preferably a plurality of seismic reflection lines covering the prospect to enable adequate interpretation and planning of the prospect. At step 520 the prospect will be most clearly illustrated by at least two seismic reflection lines which cross the prospect substantially in the direction of maximum dip as shown in FIG. 4, and at least one further seismic line which lies along the longitudinal axis of the prospect as shown at step 530. Moreover, at step 540 the seismic reflection lines may indicate the presence of at least one substantially vertical crust cutting fault (also referred to as a scimitar fault).

Seismic reflection lines provide an array of small shapes that indicate various subsurface features including anticlines, synclines, reverse faults, normal faults, and substantially vertical crust cutting faults. This array is interpreted to identify various generally horizontal horizons that were laid down at particular times at step 550. The various horizons are each assigned with a geological age. This is typically achieved by drilling a survey borehole within the prospect to extract samples at logged depths, and conducting palaeontological analysis on the samples extracted from the borehole to determine their age. Once the age of the samples identified at the logged depths is known, this information can be correlated with the equivalent depths on the seismic line. In some cases, where the horizons must be assigned with geological ages without survey borehole data from within the prospect, it may be possible to extrapolate data from outside the prospect using interpreted horizons from seismic data.

At step 560 the method involves identifying on the seismic lines at least four horizons, a first pair of horizons being produced in a first compressional pulse period and a second pair of horizons being produced in a second compressional pulse period. These compressional pulse periods have been tabulated in FIG. 1. At step 570, at least one anticline or syncline must be identified on the seismic lines at the at least four horizons produced during a compressional pulse period. The periods during which the earth experienced compressional pulses can be identified on seismic reflection lines as those horizons which have folded to form anticlines or isopachs of thinning section (anticlinal thins) during compressional growth (beneath the upper surface of the anticline), or have been offset by reverse faults. Similarly the folding may form synclines of thickened sedimentation (synclinal thicks) sub-parallel with the anticlines and thus be indicators of compressional stress during a compressional pulse period however, synclines may simply represent the broader basin depocentre and not reflect the direction of $S_H$ in the level of detail expressed by anticlines. At step 580, when a horizon is mapped in plan, those folds and/or faults that are parallel to crust cutting faults indicate a fold formed as a result of a compressional stress. This indicates a period of a compressional pulse. Finally, at step 590 each anticline that has been mapped in plan is classified into one or more predefined stress states based on its length and proximity to other anticlines or in the case of synclines, each syncline is classified into one or more predefined stress states based on its length and proximity to other synclines.

Not all folds, whether anticlinal or synclinal, are necessarily formed by compressional events. Folds can form at a barrier by gravitational sliding down a slope such as on the edge of a continent. However, many of the largest folds are sub-parallel over hundreds to thousands of square kilometers and are formed at major horizontally impacted plate tectonic compressional boundaries such as the Himalayas or Andes. New crust and cutting faults may form parallel with these folds. The folds may not necessarily coincide in time with generally smaller folds formed during globally synchronous compressional pulses induced by crustal curvature reduction within the continents (and oceanic crust). Non compressional pulse folds can be detected if they are not parallel with folds formed during a global compressional pulse period. More specifically the non compressional pulse folds within a continent are large and not necessarily substantially parallel to prior crust-cutting faults and therefore not parallel from pulse to pulse and generally do not overprint and their amplitudes are not additive from pulse to pulse. Such folds are detected by the method of isopaching if they occur during a compressional pulse period but are identifiable by $S_HD$ changes and are disregarded for the purpose of this invention provided that the folds have not been active during the most recent compressional pulse period, e.g. the Andes or Himalayas. When the plate tectonic process ceases the newly formed crust cutting faults assume the same stress generating role during subsequent compressional pulse periods as crust cutting faults.

Figure 6A:
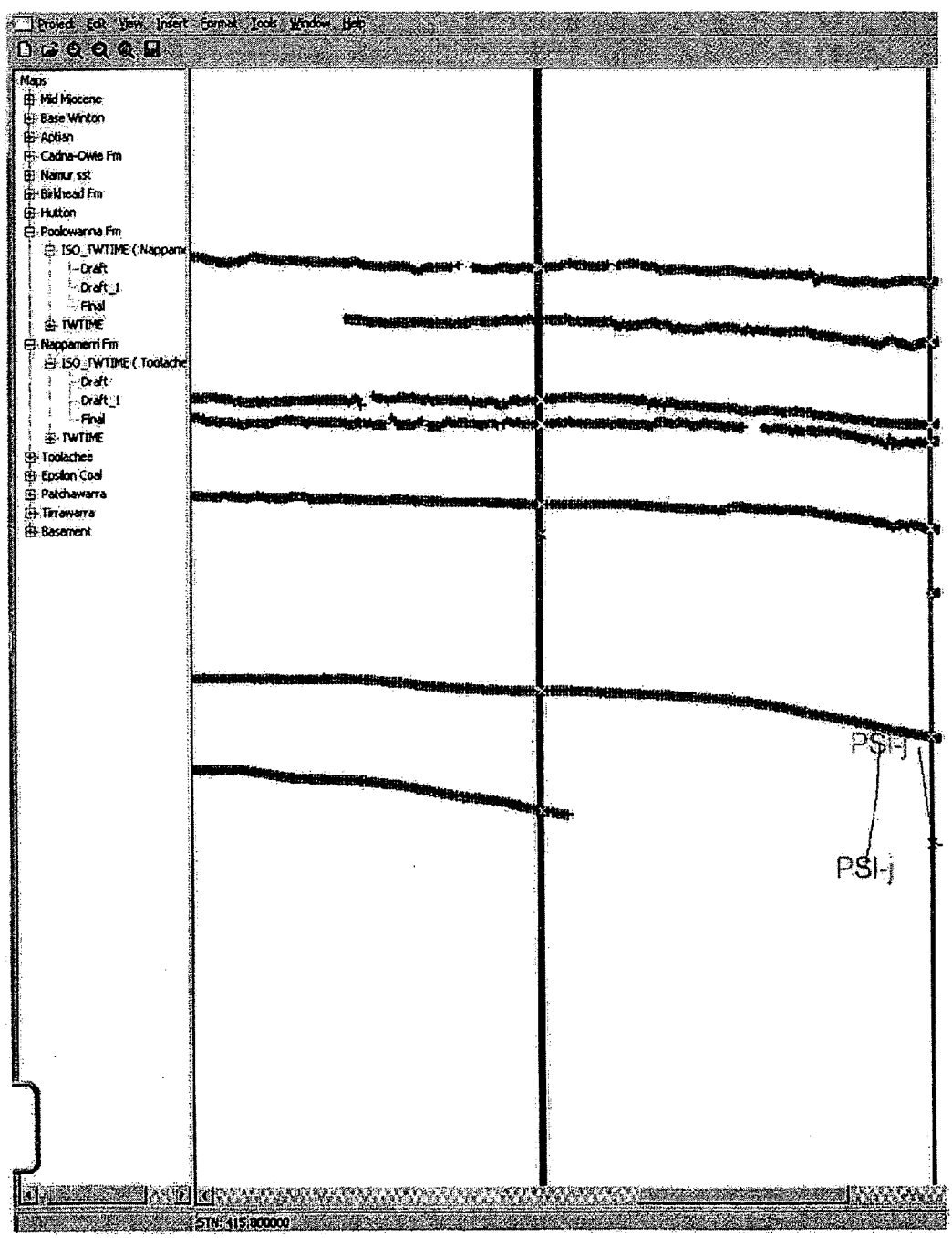
FIG. 6 is a random cross section showing the location and orientation of various faults. This cross section corresponds to the southwest corner of FIG. 8.
Figure 6B:
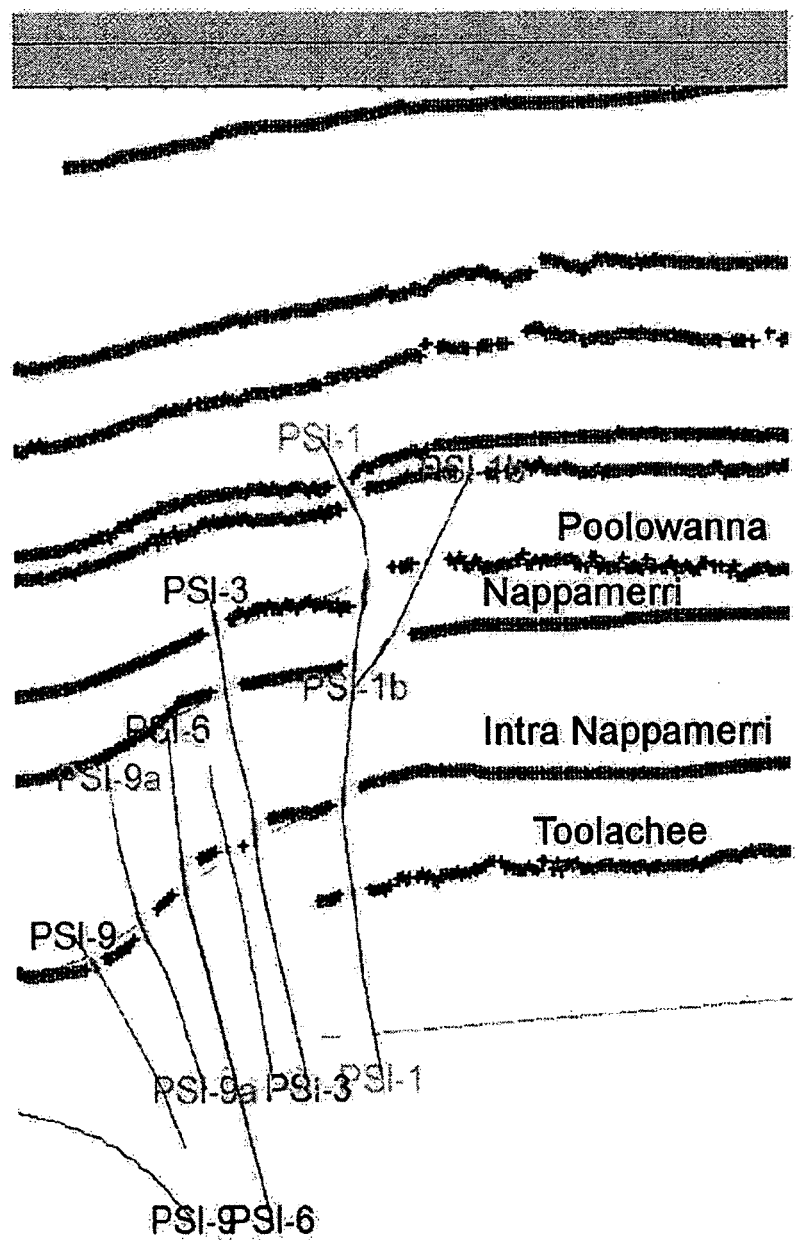
Figure 6C:
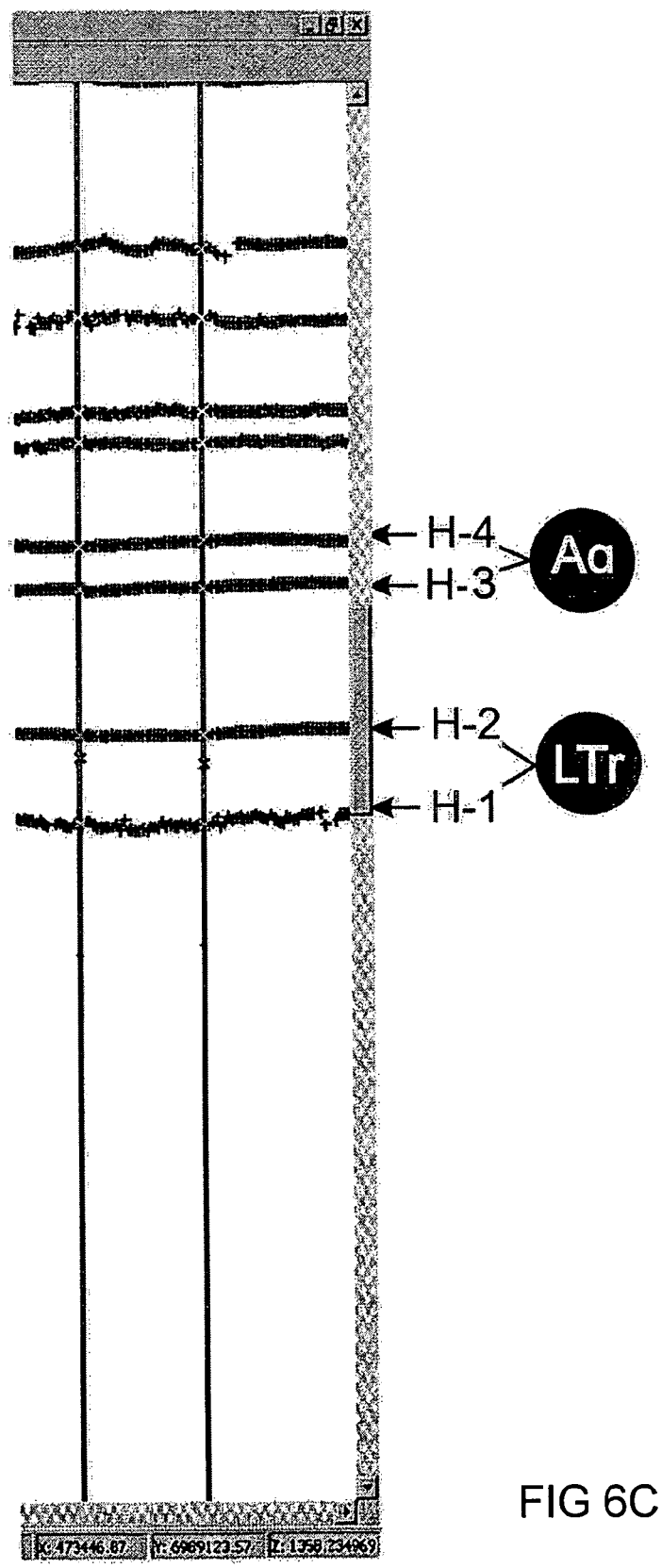

Referring now to FIG. 6, a rudimentary assessment for obvious errors in the imported seismic data can be made by reviewing a random cross section of the data showing a plurality of horizons. In the cross section, a first pair of horizons produced at a first compressional pulse period is marked as H-1,H-2 and a second pair of horizons produced at a second compressional pulse period is marked as H-3,H-4. Various faults marked as PSI-1,PSI-1*b*,PSI-3, PSI-3*a*,PSI-6,PSI-9, PSI-9*a* and PSI-j can also be identified in the cross section, including at least one crust cutting fault marked PSI-1.

Figure 7:
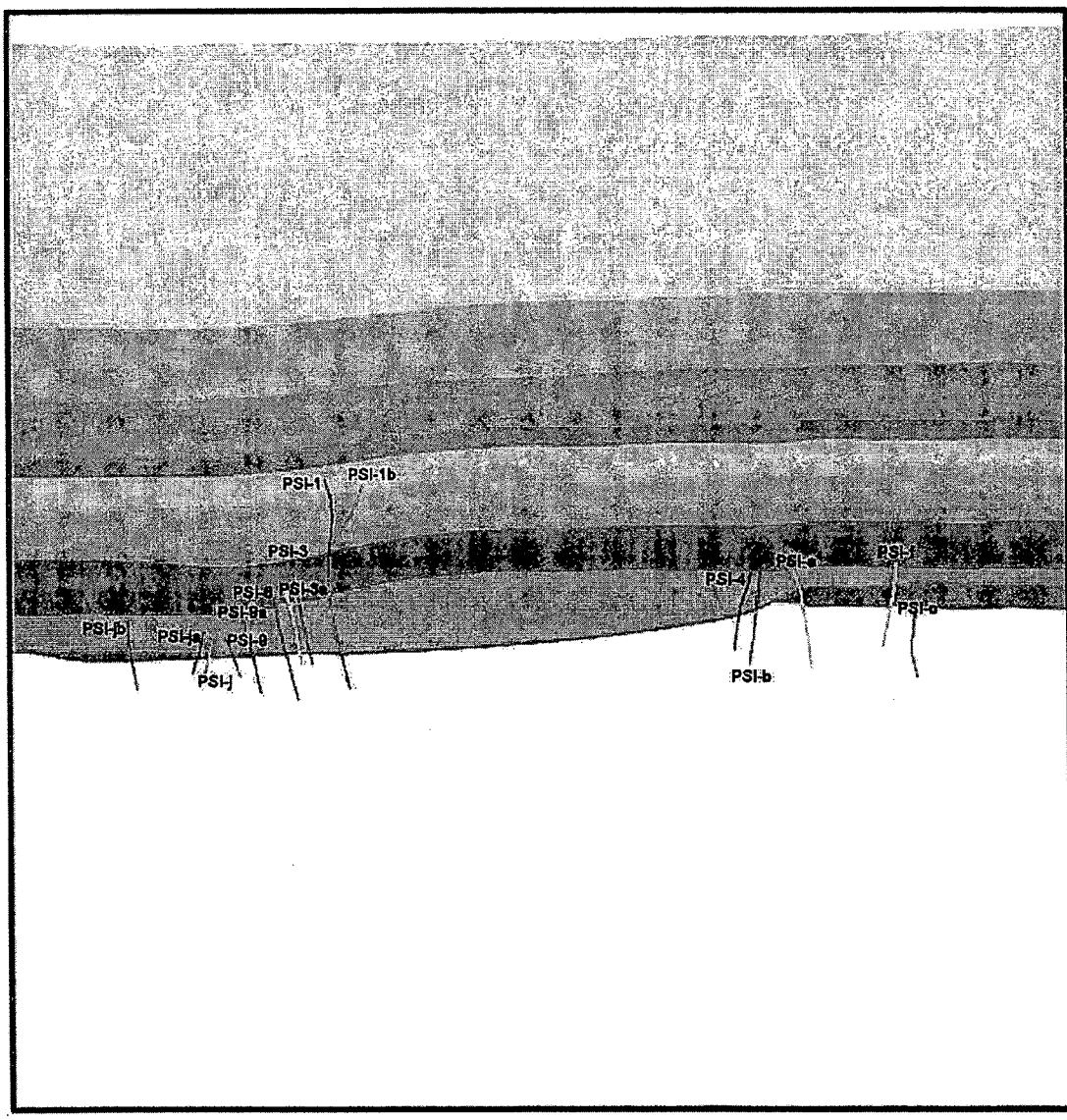
FIG. 7 is another random cross section showing the location and orientation of various faults and horizons. This cross section also corresponds to the southwest corner of FIG. 8.
Figure 8A:
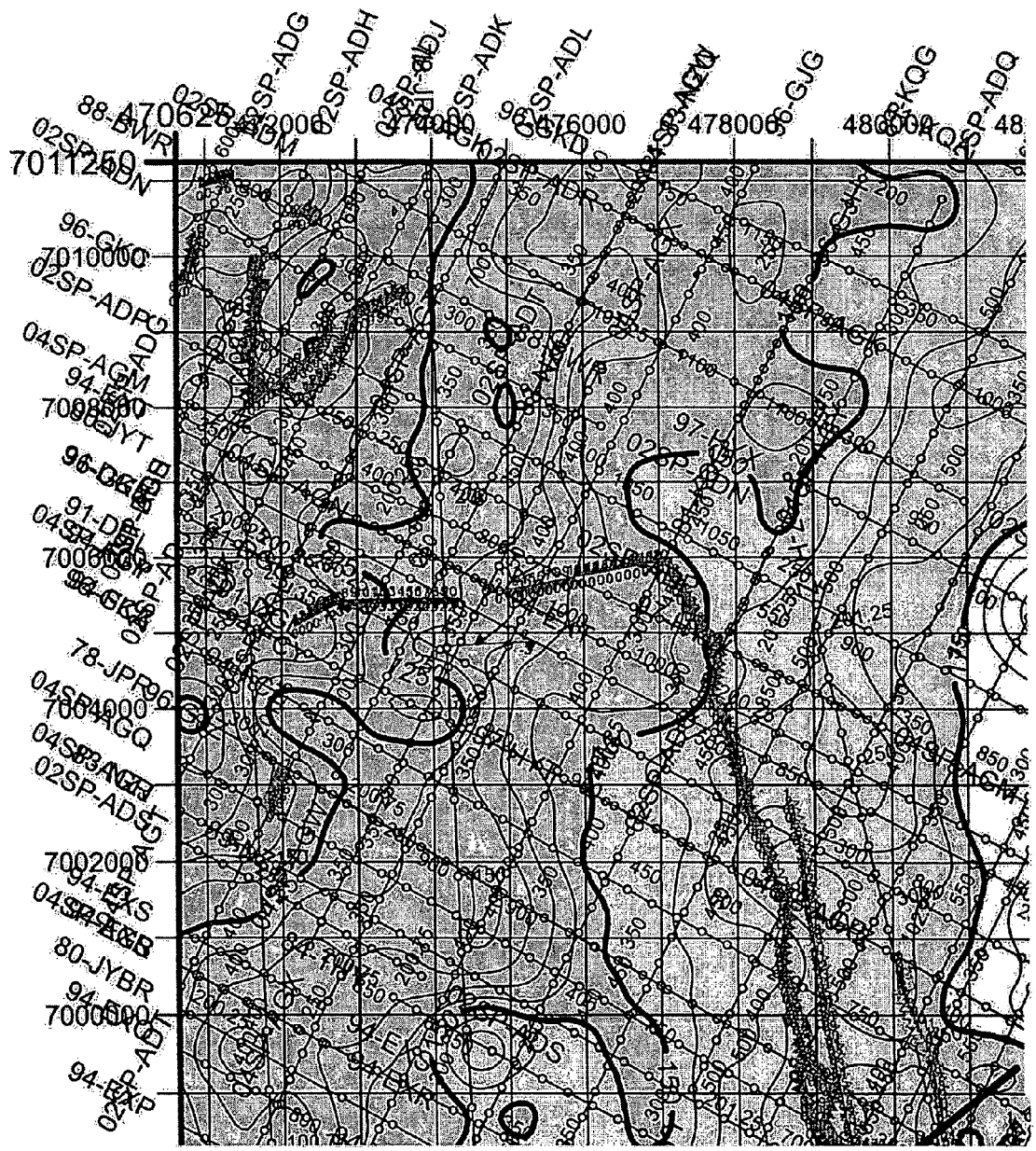
FIG. 8 is an isopach or thickness map between the first and second horizons showing the identification of various faults cutting the horizons.
Figure 8B:
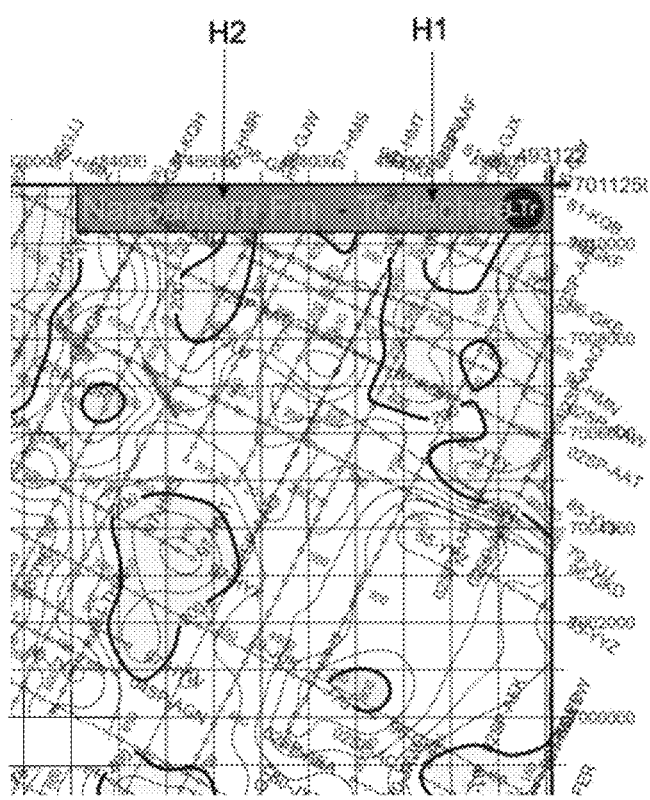
Figure 8C:
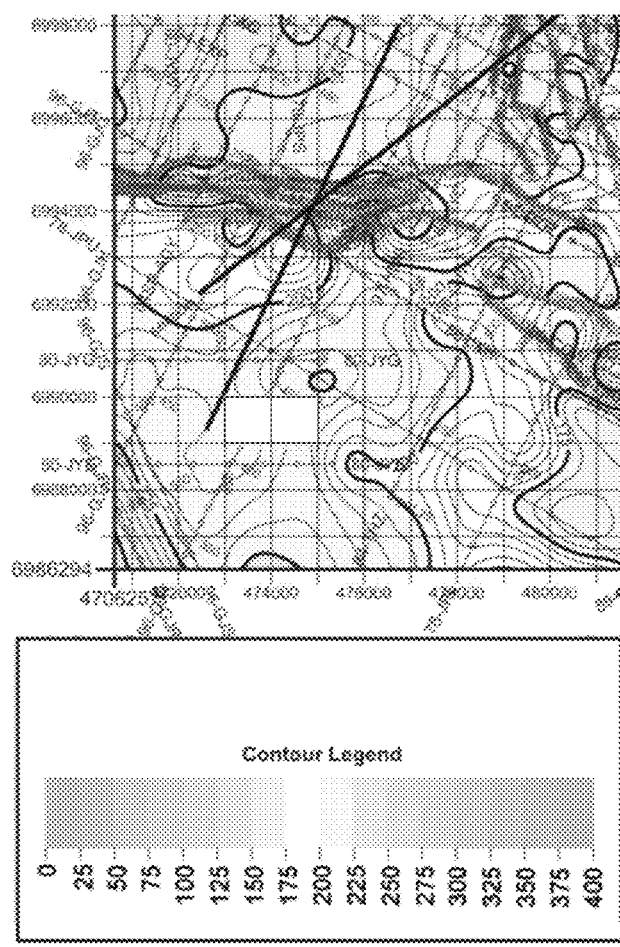
Figure 8D:
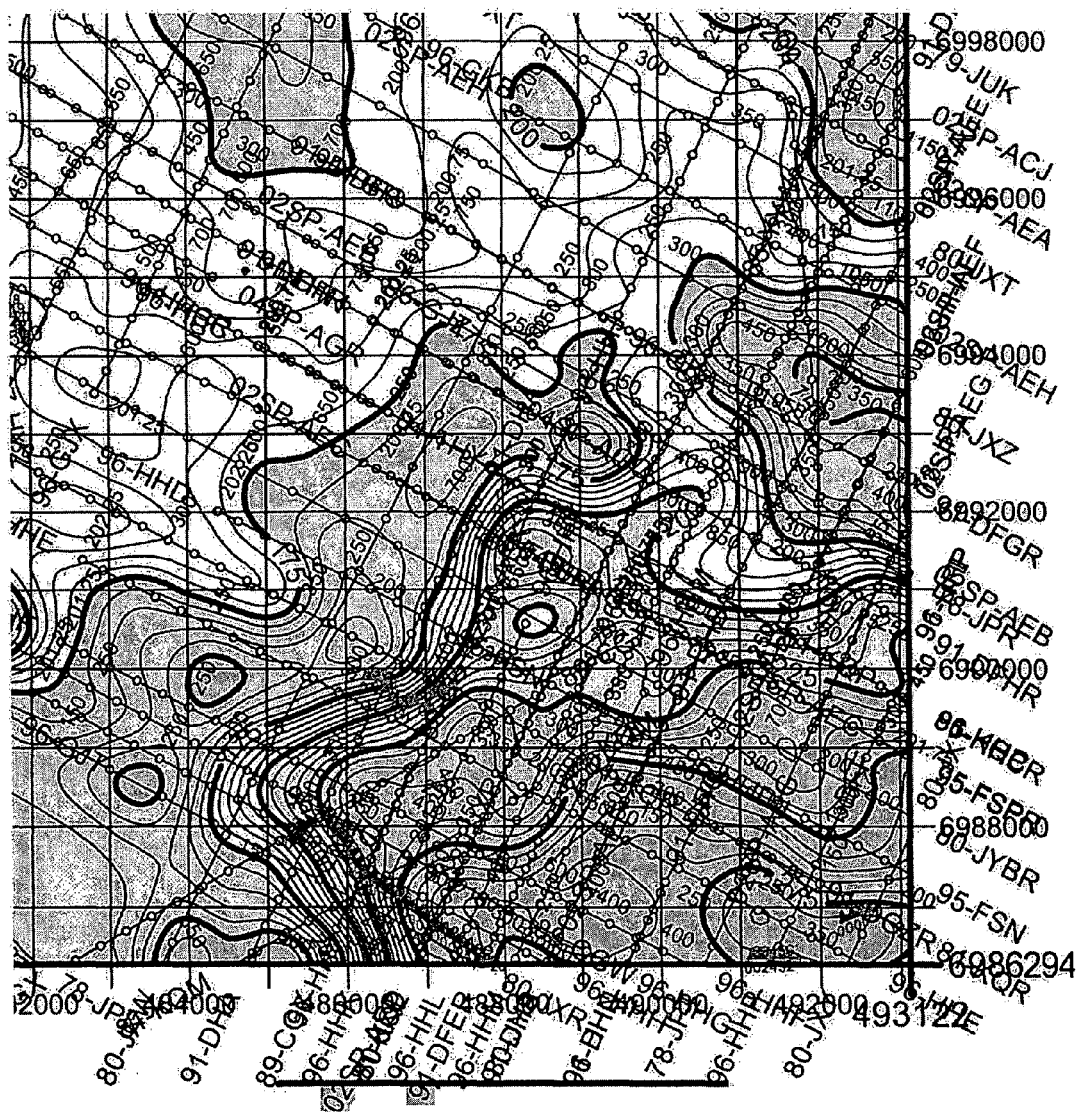

Referring now to FIG. 7, a further random cross section showing the faults and horizons marked in FIG. 6 are illustrated at a smaller scale relative to the geological time scale. This cross section provides a further opportunity to review the input horizon and fault data to be used to create the following isopach map for errors. In particular, it highlights those deepest horizons which are discontinuous and may not have been interpreted due to poor data or may have been overlooked. This provides an opportunity to rectify such anomalies and add to the interpretation if required. Each band of shading shown on the cross section represents a geological time period and corresponds to the Permian to Tertiary as shading coded on the table of compressional pulse periods illustrated in FIG. 1.

Each pair of horizons (i.e. H-1, H-2 and H-3, H-4 in FIG. 6) within or at the top and base of a compressional pulse is mapped from the seismic data and represented as a structure map. The difference between the two structure maps corresponding to each pair of horizons is the thickness or isopach of the unit that is bounded by the structure maps.

Referring now to FIG. 8. there is shown an isopach map of sediments deposited during the period of the Late Triassic (LTr) compressional pulse (see FIG. 1). The isopach map has been corrected for any misties between successive seismic surveys where the grid surface has departed from the selected horizons. A series of reverse faults can be identified on the left hand side of the isopach map. The right hand side of the map includes a number of less obvious anticlines.

The stress magnitude $S_HM$ is expressed as the ratio $S_H/S_v$. By increasing the number of Anderson stress states and recognising them in isopachs generated from existing seismic data and using the compressional pulse $S_HM=S_H/S_v$ that decrease towards the surface, it is possible to predict a quantitative value of $S_HM$ if the load $S_v$ is known or can be easily estimated. In general the load $S_v$ is estimated as being equal to 21 KPa/m (Kilo Pascals per meter) which is the accepted worldwide average load $S_v$. If there is a reason to vary $S_v$ from this average value, then $S_H$ calculated from $S_H/S_v$ will vary accordingly.

Therefore the method of the present invention involves increasing the number of stress states from the three stress states proposed by Anderson (1951) to the seven stress states detailed below:

N normal faulting wherein $S_v>S_H>S_h$

L loading stress state wherein $S_v>S_H \geq S_h$

U uplift stress state wherein $S_H>S_v \geq S_h$

ESS extensional strike slip faulting wherein $S_H>S_v>>S_h$

SS strike slip faulting wherein $S_H>S_v>S_h$

CSS compressional strike slip faulting wherein $S_H>>S_v \geq S_h$

R reverse or thrust faulting wherein $S_H>S_h>S_v$

These seven stress states may be identified on the isopachs as follows:

N normal faulting or stress state, i.e. $S_HM=N$ is identified as a straight normal fault greater than 2 kilometers in length L loading stress state, i.e. $S_HM=L$ is identified as no anticline or normal fault (i.e. no deformation)

U uplift stress state, i.e. $S_HM=U$ is identified as an anticline (or more particularly an isopachous anticlinal thin) greater than 2 kilometers in length with the nearest straight anticline greater than 2 kilometers in length and more than 5 kilometers away ESS extensional strike slip faulting or stress state, i.e. $S_HM=ESS$ is identified as a straight normal fault equal to or less than 2 kilometers in length SS strike slip faulting or stress state, i.e. $S_HM=SS$ is identified as a straight anticline greater than 2 kilometers in length with the nearest straight anticline (or more particularly an isopachous anticlinal thin) greater than 2 kilometers in length and equal to or less than 5 kilometers away or a straight syncline greater than 2 kilometers in length with the nearest straight syncline or more particularly an isopachous synclinal thick greater than 2 kilometers in length and equal to or less than 5 kilometers away.

CSS compressional strike slip faulting or stress state, i.e. $S_HM=CSS$ is identified as a straight reverse or thrust fault equal to or less than 2 kilometers in length R reverse or thrust faulting or stress state, i.e. $S_HM=R$ is identified as a straight reverse fault greater than 2 kilometers in length Identification of the above defined stress states further involves enclosing sub surface features (i.e. anticlines and/or synclines) within a racetrack shape. For instance in the case of an anticline the "racetrack" shape mimics a plan view of the anticline and is used to define the area of $S_HM$ that can be attributed to the stresses responsible for forming the respective anticlines and/or synclines. The "racetrack" shape is formed by constructing a circle with a radius ⅕ of the length of an anticline or syncline at opposing ends of the anticline or syncline such that the centre of each circle lies on the anticlinal/synclinal axis ⅕ of the distance from each end. The circles are joined to close the "racetrack" by constructing tangents with lengths of ⅗ of the length of the anticline or syncline on each pair of circles and each ⅕ of the distance on each side of the anticlinal/synclinal axis, i.e. forming a rectangle with circular ends or "racetrack". The area within each racetrack, will have an $S_HM$ value corresponding to the respective stress state as provided in Table 1 below.

Under some circumstances, the radius of the circles forming the ends of the racetrack is not ⅕ of the length. For example, in the case of a reverse fault, the radius varies from 1/20 of the length of the reverse fault in the case of a reverse fault having very small isopach offsets (i.e. <20 milliseconds seismic two-way-time, approximately 30 meters) and up to ⅕ of the length of the reverse fault in the case of a reverse fault having larger isopach offsets (i.e. >500 milliseconds, approximately 750 meters). In the case of reverse faults having intermediate isopach offsets, an intermediate radius is used (i.e. 1/15 for 20 to 100 milliseconds and 1/10 for 100 to 500 milliseconds).

Figure 9:
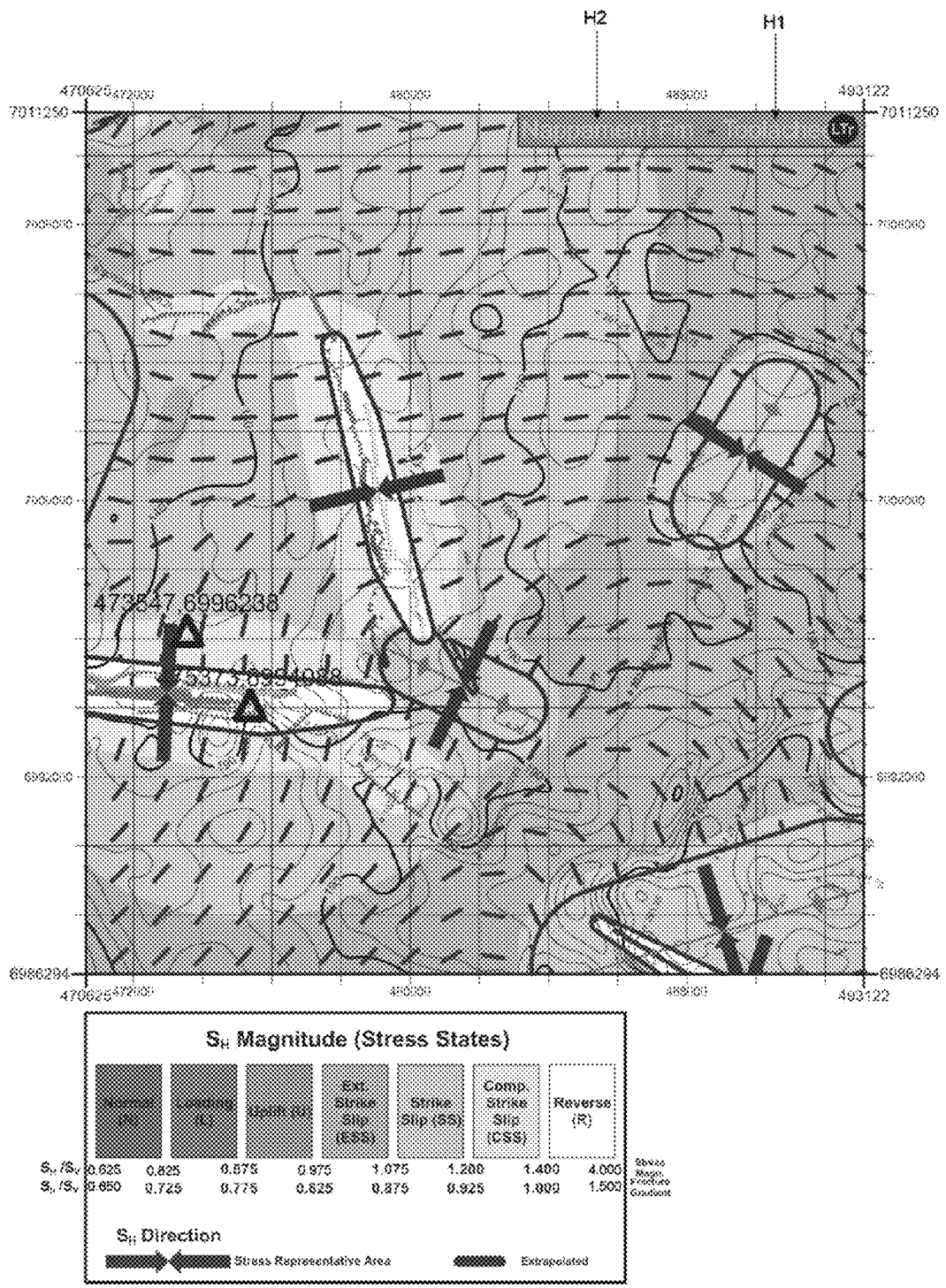
FIG. 9 is a stress map corresponding to the isopach map of FIG. 8 showing the various stress states identified at a second horizon.

Referring now to FIG. 9, there is shown the isopach map of FIG. 8 converted to a stress map identifying the stress states identified within the mapped region in accordance with an embodiment. Classification into one of the seven stress states enables the corresponding magnitude of $S_H$ to be deduced. $S_HM$ can be obtained from the legend provided below the stress map or by rolling the cursor over the stress map to determine the predicted $S_HM$ value for any point on the map.

In addition to the major horizontal stress magnitude $S_H/S_V=S_HM$, the approximate fracture gradient can also be deduced from the classification of the features identified in the stress map into one or more of the seven stress states.

The quantitative values for $S_HM=S_H/S_v$ and approximate fracture gradient=$S_h/S_v$ are estimated as corresponding to the ranges indicated in Table 1 below and both $S_H/S_v$ and $S_h/S_v$ occur concurrently. This concurrence leads to default values being assumed at the $S_H/S_v$ and $S_h/S_v$ stress state boundaries respectively (as illustrated by the legends in FIGS. 9 and 10) of 0.825 and 0.725 (i.e. $S_H/S_v$ and $S_h/S_v$) between normal and loading, 0.875 and 0.775 between loading and uplift, 0.975 and 0.825 between uplift and extensional strike slip, 1.075 and 0.875 between extensional strike slip and strike slip, 1.200 and 0.925 between strike slip and compressional strike slip, 1.400 and 1.000 between compressional strike slip and reverse. The value ranges below are in agreement with values derived from conventional post drill methods.

TABLE 1

Ranges of quantitative values of the seven stress states

| Stress State | Relative Magnitude | $S_H/S_v$ | $S_v$ | $S_h/S_v$ |
| --- | --- | --- | --- | --- |
| Normal | $S_v > S_H > S_h$ | 0.825-0.675 | 1 | 0.725-0.650 |
| Loading | $S_v > S_H \geq S_h$ | 0.875-0.825 | 1 | 0.775-0.725 |
| Uplift | $S_H > S_V \geq S_h$ | 0.975-0.875 | 1 | 0.825-0.775 |
| Extensional Strike Slip | $S_H > S_v \gg S_h$ | 1.075-0.975 | 1 | 0.875-0.825 |
| Strike Slip | $S_H > S_v > S_h$ | 1.200-1.075 | 1 | 0.925-0.875 |
| Compressional Strike Slip | $S_H \gg S_v \geq S_h$ | 1.400-1.200 | 1 | 1.000-0.925 |
| Reverse | $S_H > S_h > S_v$ | 4.000-1.400 | 1 | 1.500-1.000 |

$S_HM = S_H/S_v$ and approximate fracture gradient = $S_h/S_v$

Figure 10:
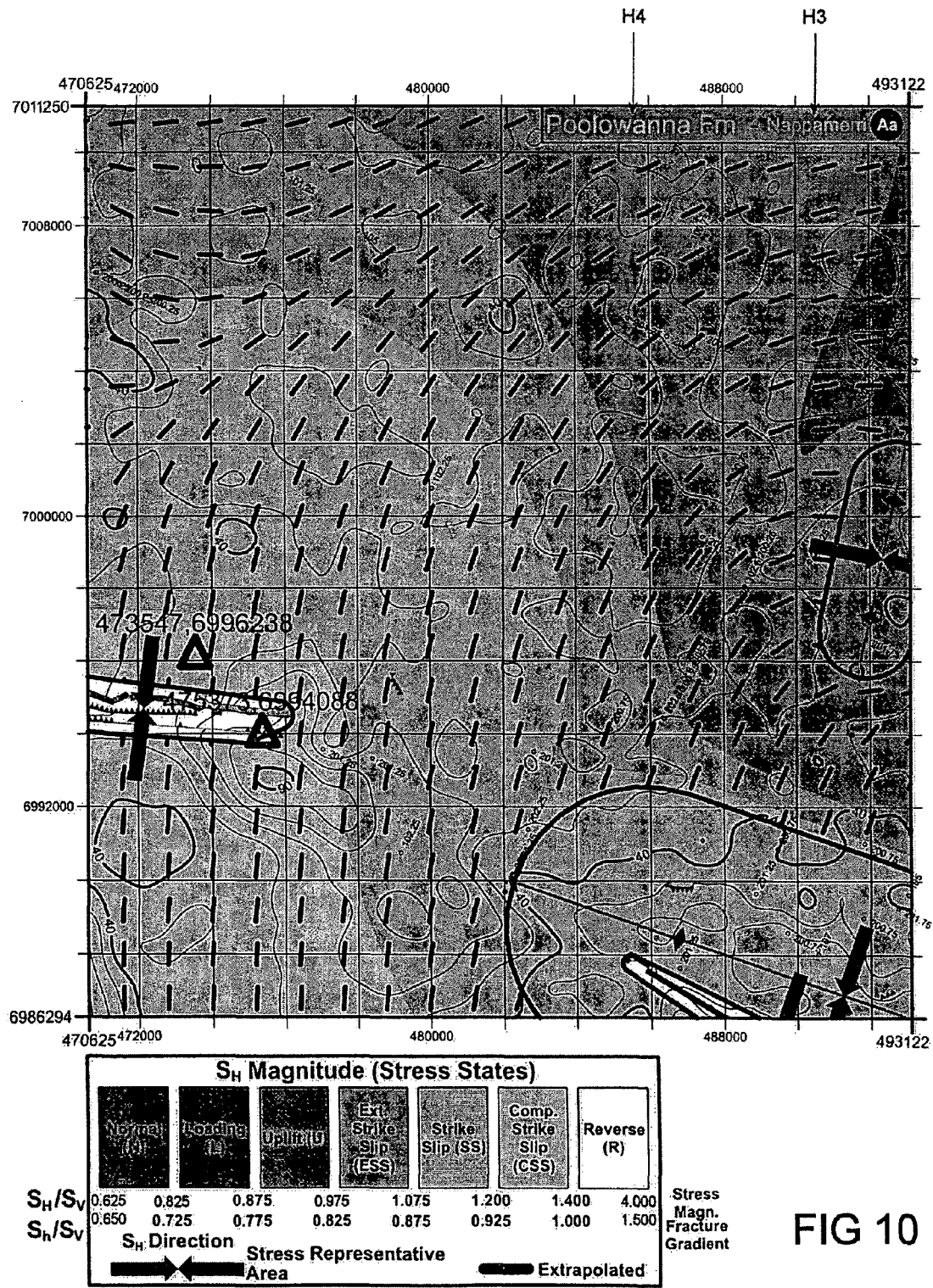
FIG. 10 is a stress map located above FIG. 9 showing the various stress states identified at a fourth horizon at the same location as the stress map of FIG. 9.

Referring now to FIG. 10, there is shown a further stress map illustrating the stress states identified at the second pair of horizons in the same location as the stress map of FIG. 9. The map represents the isopach between the Poolowanna and Nappamerri horizons formed in the Aalenian (Aa) compressional pulse period. Again each stress state and its corresponding magnitude and the approximate fracture gradient can be deduced from the legend provided below the stress map or by rolling the cursor over the stress map to determine the predicted $S_HM$ or approximate fracture gradient for any point on the map.

Figure 11:
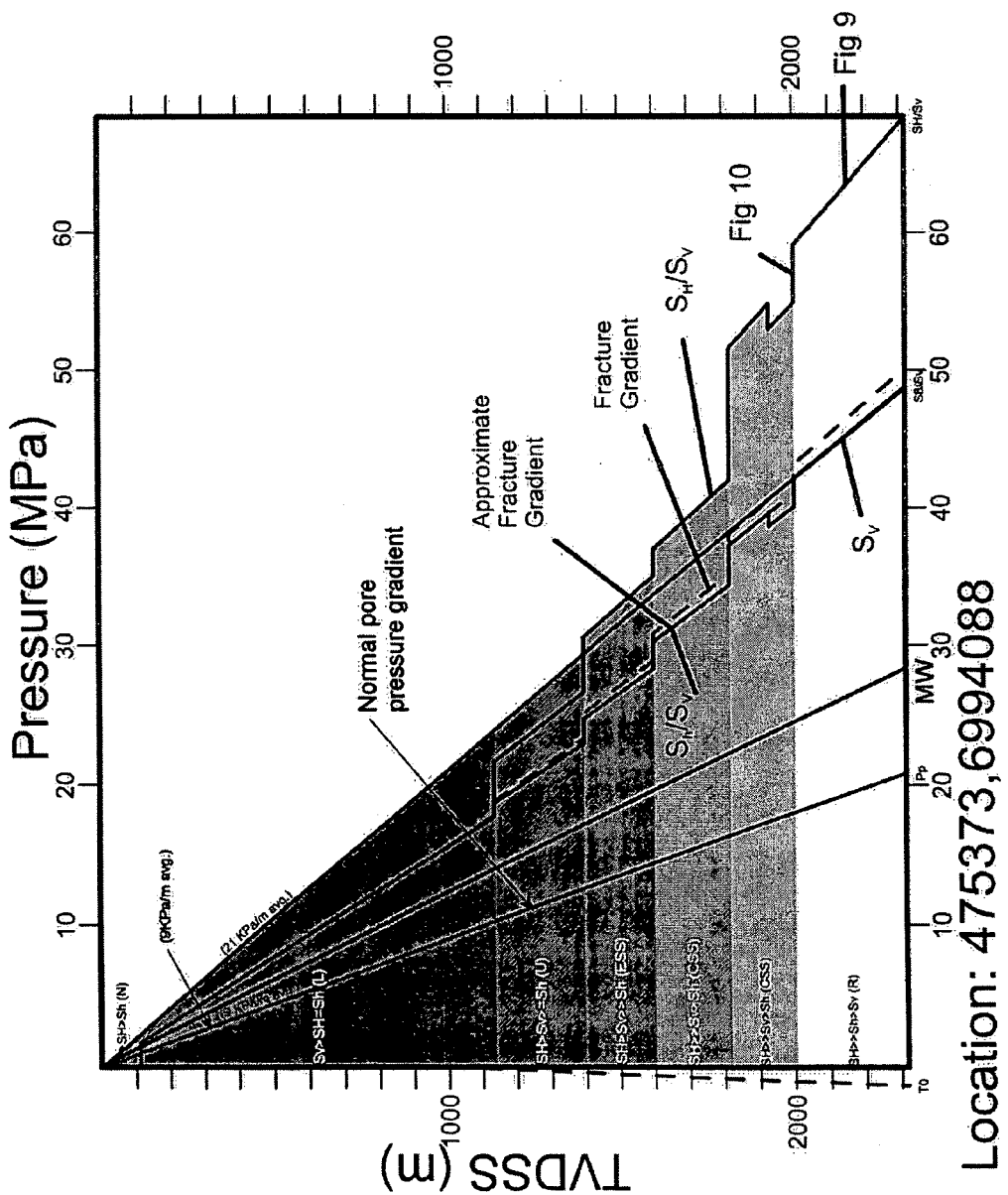
FIG. 11 is a pressure-depth graph corresponding to the location of the lower triangle on stress maps FIGS. 9 and 10.

Referring now to FIG. 11, there is shown the pressure depth plot derived in part from FIGS. 9 and 10 which show stress magnitudes provided by $S_H/S_v$ but also the approximate fracture gradient provided by $S_h/S_v$. The $S_H/S_v$ values derived for the location of the lower triangle on FIGS. 9 and 10 having coordinates 475373, 6994088, have been plotted on FIG. 11. These provide the two stress points required from a minimum of two compressional pulse stress maps in order to establish a pressure-depth plot. The plot has been continued to the surface using later (or shallower) compressional pulse stress maps. The $S_H/S_v$ points are plotted on FIG. 11 quantitatively in Mega Pascals (MPa) when the load $S_v$ is represented quantitatively. A $S_v$ gradient of 21 KPa per meter (KPa/m) is commonly used in the industry. A user can optionally reduce the gradient to say 18 KPa/m in the shallow section and increase it above 22 KPa/m in the deeper section. $S_H/S_v$ is then plotted relative to $S_v$ and quantitative values of $S_H$ at any depth can be derived from the pressure-depth plot by applying the quantitative value for $S_V$ at a particular depth to the $S_H/S_v$ at that depth.

Figure 12:
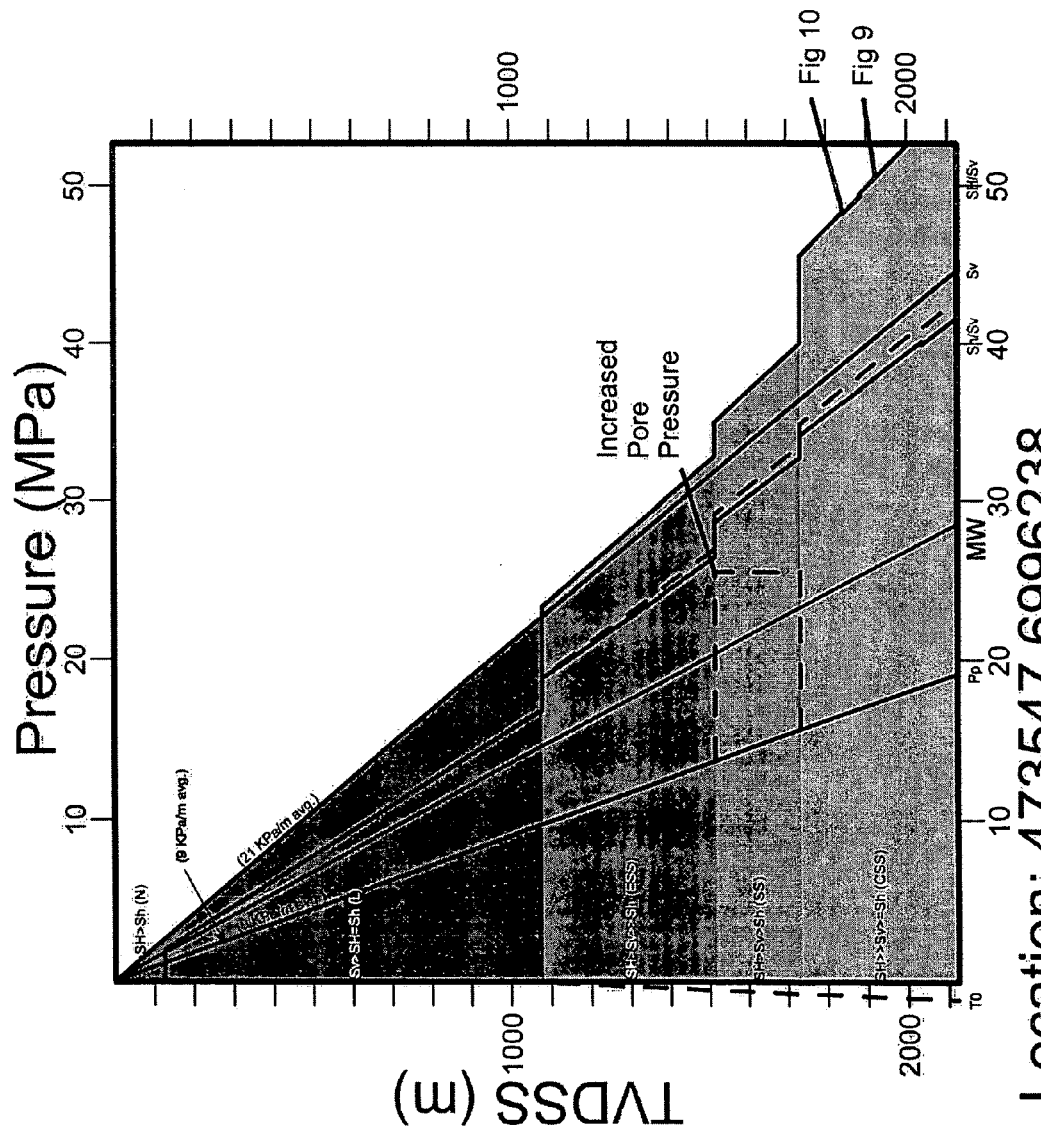
FIG. 12 is a pressure-depth graph corresponding to the location of the upper triangle on stress maps of FIGS. 9 and 10.

Referring now to FIG. 12, there is shown another pressure-depth plot in part derived from FIGS. 9 and 10 which includes the stress magnitude provided by $S_H/S_v$ and also the approximate fracture gradient $S_h/S_v$ at the location of the upper triangle shown on FIGS. 9 and 10 having coordinates 473547, 6996238.

The weight of the pore fluids or pore pressure is approximately 9 KPa/m in normally pressured basins (i.e. the normal pore pressure gradient) and has also been plotted on FIGS. 11 and 12. The tensile strength of the rock is effectively zero in the shallower section but increases with depth and may decrease with an increase in pore pressure. The tensile strength ($T_o$) is derived from actual measurements. The $T_o$ dashed gradient is used as an indication to show that the true fracture gradient is a little above $S_h/S_v$, and expressed as $S_h/S_v+T_o$.

The weight of the drilling mud employed must exceed the pressure exerted by the weight of the water column (known as the pore pressure ($P_p$)) plus the weight of the anticipated oil and/or gas. Concurrently the mud weight (MW) must not exceed the minimum horizontal stress component $S_h$ plus the tensile strength of the sealing rock unit otherwise the wellbore can fracture. As shown in FIGS. 11 and 12 $P_p$+hydrocarbons <MW<$S_h/S_V+T_o$ ($T_o$ is shown as the dashed line at left of the vertical True Vertical Depth axis In FIGS. 11 and 12). When $P_p$ approaches $S_h$ drilling must stop because the fracture gradient is about to be exceeded and control of the well may be lost resulting in a blow-out.

By way of illustration, FIG. 12 shows that from a depth of 1510 meters to 1730 meters there is a normal pore pressure of approximately 15 MPa. If the pore pressure were to increase due to the inability of fluid to escape, the pore pressure could each 25 MPa as shown by the dashed line (shown as "increased pore pressure" in FIG. 12 and also referred to as "over pressure"), being just below the approximate fracture gradient of 27 MPa which is almost the failure point of the rock. The industry uses velocity data from seismic surveys and well logs to identify zones where it is interpreted the same rock type exhibits a slower seismic travel time equating to a slower velocity than experienced in nearby areas. The slower velocity is caused by an increase in pore pressure.

It is desirable that other independent methods be employed in order to estimate zones of elevated pore pressure.

If a structure map comprising the lower horizon of any isopach is substantially flat or uniformly dipping while the upper structure map is not substantially parallel with the lower horizon and is undulating then the isopach bounds a mobile lower density unit, the thicker parts of which are at increased pore pressure and maybe attempting to rise through the sedimentary sequence. That is to say the pore pressure has a normal gradient within pairs of horizons formed during (or even outside) a compressional pulse period, but an elevated or increased pore pressure in the thicker or synclinal parts of the isopach if the synclinal thick overlies one or more anticlinal thins formed during compressional pulse periods over a prospect.

If the isopach thick between adjacent isopach thins is less than twice the thickness of the thins then the thick is indicative of shale and the pore pressure is elevated, an estimation of which is approximately the normal hydrostatic gradient multiplied by the ratio of the isopachous thick to nearest thin to a maximum of 2.

It will be appreciated that if the ratio of isopachous thick to thin is greater than 2 the unit has substantially lower density than the surrounding rock and is probably diapiric salt.

It should be appreciated that any horizon produced during a period of a compressional pulse could be selected and the number of interpreted horizons adopted to be used over the prospect depends generally on the depth to which drilling is intended and the number of horizons in which drilling problems may occur.

Figure 13:
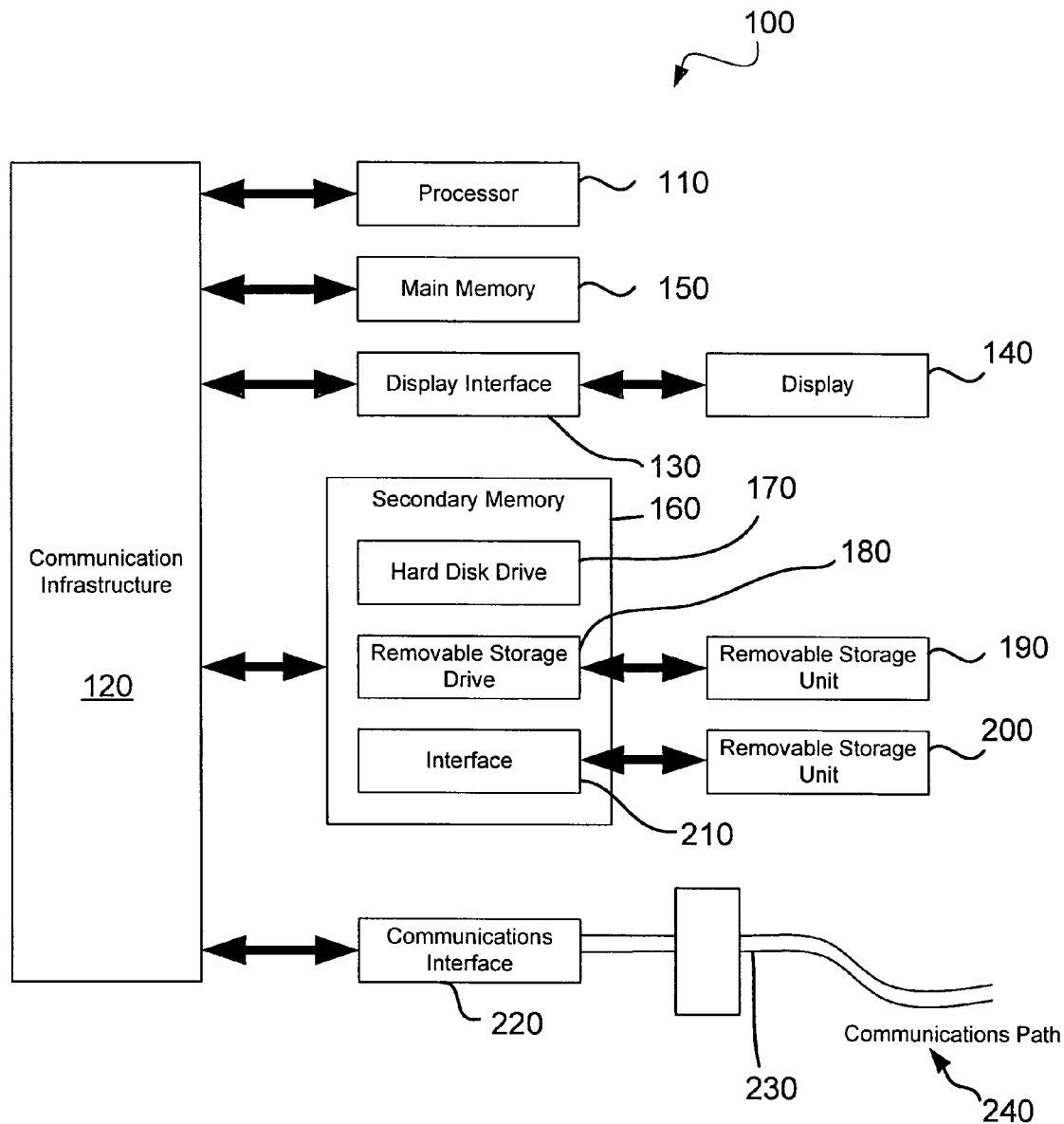
FIG. 13 is schematic diagram of a computer system used to implement the method of the present invention.

Referring now to FIG. 13, the method may be implemented using hardware, software or a combination thereof and may be implemented in one or more computer systems or processing systems. In addition, the functionality of the client user terminal and its graphic user interface, as well as the server may be provided by one or more computer systems capable of carrying out the above described functionality.

The computer system 100 includes one or more processors, such as processor 110. The processor 110 is connected to a communication infrastructure 120. The computer system 100 may include a display interface 130 that forwards graphics, texts and other data from the communication infrastructure 120 for supply to the display unit 140. The computer system 100 may also include a main memory 150, preferably random access memory, and may also include a secondary memory 160.

The secondary memory 160 may include, for example, a hard disk drive 170, magnetic tape drive, optical disk drive, etc. The removable storage drive 180 reads from and/or writes to a removable storage unit 190 in a well known manner. The removable storage unit 190 represents a floppy disk, magnetic tape, optical disk, etc.

As will be appreciated, the removable storage unit 180 includes a computer usable storage medium having stored therein computer software in a form of a series of instructions to cause the processor 110 to carry out desired functionality. In alternative embodiments, the secondary memory 160 may include other similar means for allowing computer programs or instructions to be loaded into the computer system 100. Such means may include, for example, a removable storage unit 200 and interface 210.

The computer system may also include a communications interface 220. Communications interface 220 allows software and data to be transferred between the computer system and external devices. Examples of communication interface 220 may include a modem, a network interface, a communications port, a PCMIA slot and card etc. Software and data transferred via a communications interface 220 are in the form of signals which may be electromagnetic, electronic, optical or other signals capable of being received by the communications interface 220. The signals are provided to communications interface 220 via a communications path 240 such as a wire or cable, fibre optics, phone line, cellular phone link, radio frequency or other communications channels.

Although in the above described embodiments the invention is implemented primarily using computer software, in other embodiments the invention may be implemented primarily in hardware using, for example, hardware components such as an application specific integrated circuit (ASICs). Implementation of a hardware state machine so as to perform the functions described herein will be apparent to persons skilled in the relevant art. In other embodiments, the invention may be implemented using a combination of both hardware and software.

The method uses compressional pulse periods to interpret existing 2D or 3D seismic data to enable geologists and geophysists to predict fault seal, drilling engineers to predict stresses in well planning to prevent expensive borehole breakout or collapse, and reservoir engineers to predict open fractures for optimal hydrocarbon recovery.

It is an advantage of the present invention, that the direction and magnitude of geological stress can be determined pre-drill. It is a stand alone technique that removes the need for expensive post-drill, conventional borehole geomechanics. Having derived the direction and magnitude of $S_H$ from seismic reflection data, it is possible to predict sealing and non sealing faults, open and closed fracture directions and the optimal position and orientation for inclined or horizontal wells.

This repetition of stress as embodied in the repetition of compressional pulses provides a workflow for stress consistent seismic interpretation which can predict horizontal and vertical changes in the direction of the major horizontal compressional component of a stress $S_H D$ and also in the magnitude of the stress $S_H M$. It is now possible to derive pre-drill at any desired point, important exploration and production variables such as stress related fault seal and open fracture orientation. Similarly important reservoir development parameters such as fracture gradients and wellbore stability prediction will maximise recovery efficiencies and reduce development costs. This technique will also aid in effective carbon dioxide sequestration, a challenging new field of endeavour.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The claims defining the invention are as follows:

1. A method of providing a quantitative prediction using a processor of a magnitude of a maximum horizontal stress $(S_H/S_V)$ at a point on a horizon within a prospect wherein the processor is programmed to perform the following steps:
   a) receiving seismic reflection data at the processor including a plurality of seismic reflection lines within the prospect, wherein the processor:
   b) selects at least two seismic reflection lines which cross the prospect substantially in the direction of maximum dip;
   c) selects at least one further seismic line which lies substantially along a longitudinal axis of the prospect;

d) identifies on one of the plurality of seismic lines at least one substantially vertical crust cutting fault;

e) identifies on the selected seismic lines a plurality of horizons;

f) identifies on the selected seismic lines at least four horizons, a first pair of horizons produced in a first compressional pulse period and a second pair of horizons produced in a second compressional pulse period;

g) interprets the seismic reflection data to identify at least one anticline and/or syncline;

h) maps in plan the identified anticlines and/or synclines; and i) classifies each anticline into one or more predefined stress states based on the length of the anticline and its proximity to adjacent anticlines and/or classifying each syncline into one or more predefined stress states based on the length of the syncline and its proximity to adjacent synclines, wherein each predefined stress state corresponds to a predetermined value for the magnitude of the maximum horizontal stress ($S_H/S_V$).

2. A method according to claim 1, wherein areas on the seismic lines at a horizon produced during the first compressional pulse period where there is at least one anticline are classified as being in an uplift stress state.

3. A method according to claim 1, further including the step of:

j) identifying on the seismic lines at a horizon produced during the second compressional pulse period areas where there are no anticlines or synclines;

wherein the magnitude of the maximum horizontal stress ($S_H/S_V$) decreases from the area identified in steps b to g to the area identified in step j.

4. A method according to claim 3, further including the steps of:

k) selecting a horizon which was produced during a compressional pulse period that is cut by at least one fault; and l) classifying each fault into one or more predefined stress states based on the length of each fault.

5. A method according to claim 4, wherein a fault that cuts a horizon produced during a compressional pulse period is classified as being in a reverse, thrust or normal stress state.

6. A method according to claim 5, wherein the magnitude of the maximum horizontal stress ($S_H/S_V$) decreases from the reverse stress state through to the normal stress state.

7. A method according to claim 6, further including the step of repeating the method of determining the magnitude of the maximum horizontal stress ($S_H/S_V$) for a plurality of horizons produced during a compressional pulse period, and extrapolating the results obtained between the horizons.

8. A method according to claim 6, further including the step of providing a quantitative prediction of an approximate fracture gradient ($S_h/S_V$) by classifying each anticline into one or more predefined stress states based on the length of each anticline and its proximity to adjacent anticlines and/or by classifying each syncline into one or more predefined stress states based on the length of each syncline and its proximity to adjacent synclines wherein each predefined stress state corresponds to a predetermined value for the fracture gradient.

9. A method according to claim 8, further including the step of providing a quantitative prediction of the approximate fracture gradient ($S_h/S_V$) by classifying each fault into one or more predefined stress states based on the length of each fault.

10. A method according to claim 8, wherein:

a) a normal stress state corresponds to an approximate fracture gradient ($S_h/S_V$) in a range of 0.725 to 0.650;

b) a loading stress state corresponds to an approximate fracture gradient ($S_h/S_V$) in a range of 0.775 to 0.725;

c) a uplift stress state corresponds to an approximate fracture gradient ($S_h/S_V$) in a range of 0.825 to 0.775;

d) an extensional strike slip stress state corresponds to an approximate fracture gradient ($S_h/S_V$) in a range of 0.875 to 0.825;

e) a strike slip stress state corresponds to an approximate fracture gradient ($S_h/S_V$) in a range of 0.925 to 0.875;

f) a compressional strike slip stress state corresponds to an approximate fracture gradient ($S_h/S_V$) in a range of 1.000 to 0.925; and g) a reverse stress state corresponds to an approximate fracture gradient ($S_h/S_V$) in a range of 1.500 to 1.000.

11. A method according to claim 4, wherein a normal stress state is defined as a straight normal fault greater than 2 kilometers in length.

12. A method according to claim 4, wherein a loading stress state is defined as having no anticline and no fault.

13. A method according to claim 4, wherein an uplift stress state is defined as a straight anticline greater than 2 kilometers in length with the nearest straight anticline greater than 2 kilometers in length and more than 5 kilometers away.

14. A method according to claim 4, wherein an extensional strike slip stress state is defined as a straight normal fault equal to or less than 2 kilometers in length.

15. A method according to claim 4, wherein a strike slip stress state is defined as a straight anticline greater than 2 kilometers in length with the nearest straight anticline greater than 2 kilometers in length and equal to or less than 5 kilometers away, or a straight syncline greater than 2 kilometers in length with the nearest straight syncline greater than 2 kilometers in length and equal to or less than 5 kilometers away.

16. A method according to claim 4, wherein a compressional strike slip state is defined as a straight reverse fault equal to or less than 2 kilometers in length.

17. A method according to claim 4, wherein a reverse stress state is defined as a straight reverse fault greater than 2 kilometers in length.

18. A method according to claim 4, wherein:

a) a normal stress state corresponds to a maximum horizontal stress magnitude ($S_H/S_V$) in a range of 0.825 to 0.675;

b) a loading stress state corresponds to a maximum horizontal stress magnitude ($S_H/S_V$) in a range of 0.875 to 0.825;

c) a uplift stress state corresponds to a maximum horizontal stress magnitude ($S_H/S_V$) in a range of 0.975 to 0.875;

d) an extensional strike slip stress state corresponds to a maximum horizontal stress magnitude ($S_H/S_V$) in a range of 1.075 to 0.975;

e) a strike slip stress state corresponds to a maximum horizontal stress magnitude ($S_H/S_V$) in a range of 1.200 to 1.075;

f) a compressional strike slip stress state corresponds to a maximum horizontal stress magnitude ($S_H/S_V$) in a range of 1.400 to 1.200; and g) a reverse stress state corresponds to a maximum horizontal stress ($S_H/S_V$) magnitude in a range of 4.000 to 1.400.

19. A system for providing a quantitative prediction of a magnitude of a maximum horizontal stress ($S_H/S_V$) at a point on a horizon within a prospect, the system comprising a processor and associated memory device for storing a series of instructions to cause the processor to carry out a method according to claim 1.

* * * * *